(12) United States Patent
Martello

(10) Patent No.: US 12,478,961 B2
(45) Date of Patent: Nov. 25, 2025

(54) SUPPORT FOR CONSERVING SAMPLES OF BIOLOGICAL MATERIAL AND METHOD OF PRODUCTION THEREOF

(71) Applicant: Copan Italia S.p.A., Brescia (IT)

(72) Inventor: Giorgio Martello, Bresci (IT)

(73) Assignee: Copan Italia S.p.A., Brescia (IT)

( * ) Notice: Subject to any disclaimer, the term of this patent is extended or adjusted under 35 U.S.C. 154(b) by 0 days.

(21) Appl. No.: 19/205,823

(22) Filed: May 12, 2025

(65) Prior Publication Data

US 2025/0269570 A1 Aug. 28, 2025

Related U.S. Application Data

(62) Division of application No. 16/768,432, filed as application No. PCT/IB2018/059440 on Nov. 29, 2018.

(30) Foreign Application Priority Data

Dec. 1, 2017 (IT) .................. 102017000139132

(51) Int. Cl.
*B29C 45/14* (2006.01)
*B01L 3/00* (2006.01)

(52) U.S. Cl.
CPC ...... *B29C 45/14336* (2013.01); *B01L 3/5023* (2013.01); *B29C 45/14065* (2013.01); *B01L 2300/021* (2013.01); *B01L 2300/069* (2013.01); *B01L 2300/0816* (2013.01); *B01L 2300/126* (2013.01); *B29C 2045/14901* (2013.01); *B29C 2045/14909* (2013.01)

(58) Field of Classification Search
CPC ........ B29C 45/14065; B29C 45/14336; B29C 2045/14901; B29C 2045/14909
See application file for complete search history.

(56) References Cited

U.S. PATENT DOCUMENTS 4,866,428 A 9/1989 Hinkle
10,150,236 B2 * 12/2018 Weckerle .......... B29C 45/14336
(Continued)

FOREIGN PATENT DOCUMENTS

CN 1950149 A 4/2007
CN 102026723 A 4/2011
(Continued)

OTHER PUBLICATIONS

Chung et al., "Rapid and low-cost prototyping of medical devices using 3D printed molds for liquid injection molding," Journal of visualized experiments: JoVE, Jun. 27, 2014, (88):51745.
(Continued)

*Primary Examiner* — Atul P. Khare
(74) *Attorney, Agent, or Firm* — Fish & Richardson P.C.

(57) ABSTRACT

A support for conserving a sample of biological material comprising at least a substantially rigid body made of moulded plastic material, comprising at least a first through opening and at least a first portion of an absorbent matrix suitable for conserving a sample of biological material, fixed within the first through opening. The first portion of the absorbent matrix has at least a first part without support from the body and suspended inside the first through opening, the first part being directly accessible to contact.

16 Claims, 10 Drawing Sheets

(56) References Cited

U.S. PATENT DOCUMENTS

| | | | |
|---|---|---|---|
| 10,646,872 B2 * | 5/2020 | Triva | B01L 3/505 |
| 11,690,454 B2 * | 7/2023 | Oomen | A47C 7/282 |
| | | | 297/284.1 |
| 2001/0012493 A1 | 8/2001 | Zermani | |
| 2003/0170143 A1 * | 9/2003 | Cunningham | B01L 3/5085 |
| | | | 422/65 |
| 2005/0009122 A1 | 1/2005 | Whelan et al. | |
| 2005/0276728 A1 | 12/2005 | Muller | |
| 2012/0130457 A1 | 5/2012 | Gammons et al. | |
| 2013/0260477 A1 | 10/2013 | Smith et al. | |
| 2013/0280725 A1 | 10/2013 | Ismagilov et al. | |
| 2014/0050361 A1 | 2/2014 | Triva | |
| 2015/0153315 A1 | 6/2015 | Taylor | |
| 2015/0316485 A1 | 11/2015 | List et al. | |
| 2016/0033373 A1 | 2/2016 | Hill et al. | |
| 2016/0184815 A1 * | 6/2016 | Triva | B01L 3/505 |
| | | | 422/500 |
| 2016/0367227 A1 | 12/2016 | Triva | |
| 2017/0234778 A1 | 8/2017 | Sangha | |
| 2017/0260567 A1 | 9/2017 | Selden et al. | |
| 2017/0341844 A1 * | 11/2017 | Geis | B65D 85/68 |
| 2021/0001329 A1 | 1/2021 | Martello | |

FOREIGN PATENT DOCUMENTS

| | | | |
|---|---|---|---|
| CN | 203830027 U | 9/2014 | |
| CN | 105102980 A | 11/2015 | |
| CN | 105392363 A | 3/2016 | |
| CN | 105531029 A | 4/2016 | |
| CN | 105813751 A | 7/2016 | |
| CN | 106029910 A | 10/2016 | |
| CN | 106124252 A | 11/2016 | |
| EP | 0912245 A1 | 2/2002 | |
| EP | 1445021 A1 | 8/2004 | |
| EP | 1758681 A2 | 3/2007 | |
| IT | MI20131354 A1 | 2/2015 | |
| JP | 2014-503347 A | 2/2014 | |
| JP | 2017-021044 A | 1/2017 | |
| KR | 101809814 B1 * | 12/2017 | C02F 3/208 |
| WO | WO 90/03959 A1 | 4/1990 | |
| WO | 0912245 B1 | 2/2002 | |
| WO | WO 2006056658 A1 | 6/2006 | |
| WO | WO 2006059701 A1 | 6/2006 | |
| WO | WO 2008144390 A1 | 11/2008 | |
| WO | WO 2009126099 A1 | 10/2009 | |
| WO | WO 2012130457 A1 | 10/2012 | |
| WO | WO 2015019205 A1 | 2/2015 | |
| WO | WO 2019106588 A1 | 6/2019 | |

OTHER PUBLICATIONS

CN Notice of Allowance issued in Chinese Application No. 201880077842.3, dated May 26, 2022, 8 pages (With English Translation).

CN Office Action issued in Chinese Application No. 201880077842.3, dated Dec. 21, 2021, 19 pages (With English Translation).

Nian et al., "Warpage control of thin-walled injection molding using local mold temperatures," International Communications in Heat and Mass Transfer, Feb. 2015, 61:102-110.

Office Action in Australian Appln. No. 2018374628, mailed on Apr. 21, 2023, 3 pages.

Office Action in European Appln. No. 18842457.6, mailed on Aug. 12, 2021, 4 pages.

Office Action in European Appln. No. 18842457.6, mailed on Feb. 2, 2025, 7 pages.

Office Action in European Appln. No. 18842457.6, mailed on Jul. 1, 2024, 3 pages.

Office Action in Japanese Appln. No. 2020-528382, mailed on Jul. 11, 2023, 5 pages (with Machine Translation).

Office Action in Japanese Appln. No. 2020-528382, mailed on May 9, 2023, 4 pages (with Machine Translation).

Office Action in Japanese Appln. No. 2020-528382, mailed on Oct. 20, 2022, 10 pages (with Machine Translation).

PCT International Search Report and Written Opinion in International Application No. PCT/IB2018/059,440, dated Jun. 3, 2019, 9 pages.

RU Office Action issued in Russian Application No. 2020116257, dated Feb. 4, 2022, 19 pages (With English Translation).

Some Critical Issues for Injection Molding, First Edition, Jian Wang (Ed), Mar. 23, 2012, 280 pages.

Office Action in European Appln. No. 18842457.6, mailed on Jul. 1, 2024, 5 pages.

International Search Report and Written Opinion in International Appln. PCT/IB2018/059,440, mailed on Mar. 6, 2019, 8 pages.

* cited by examiner

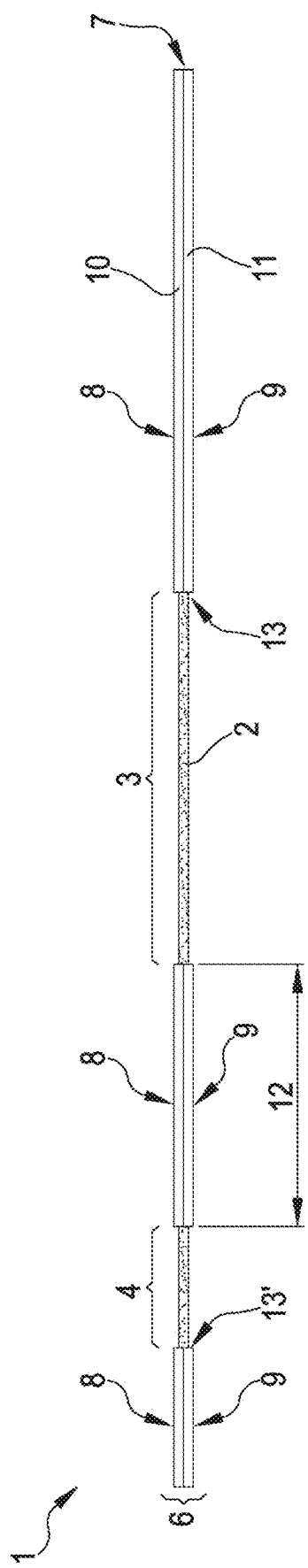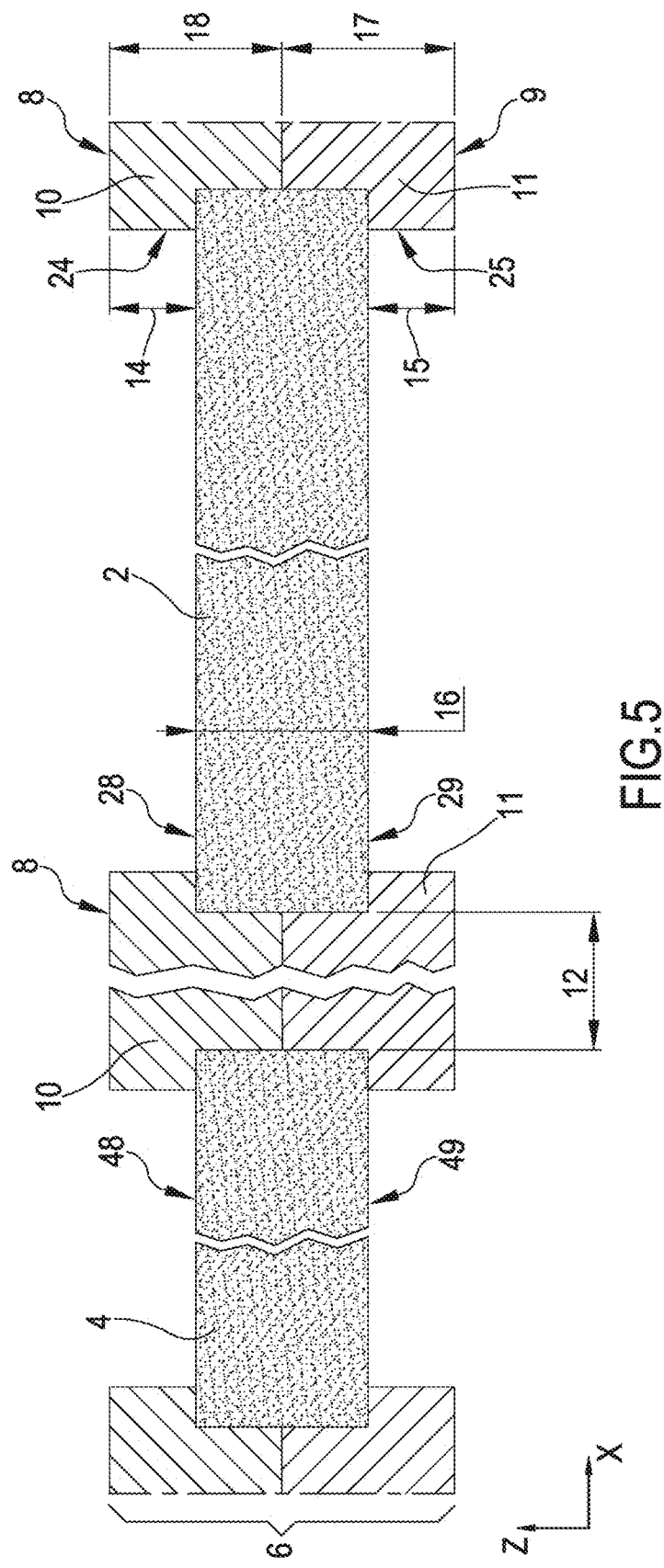

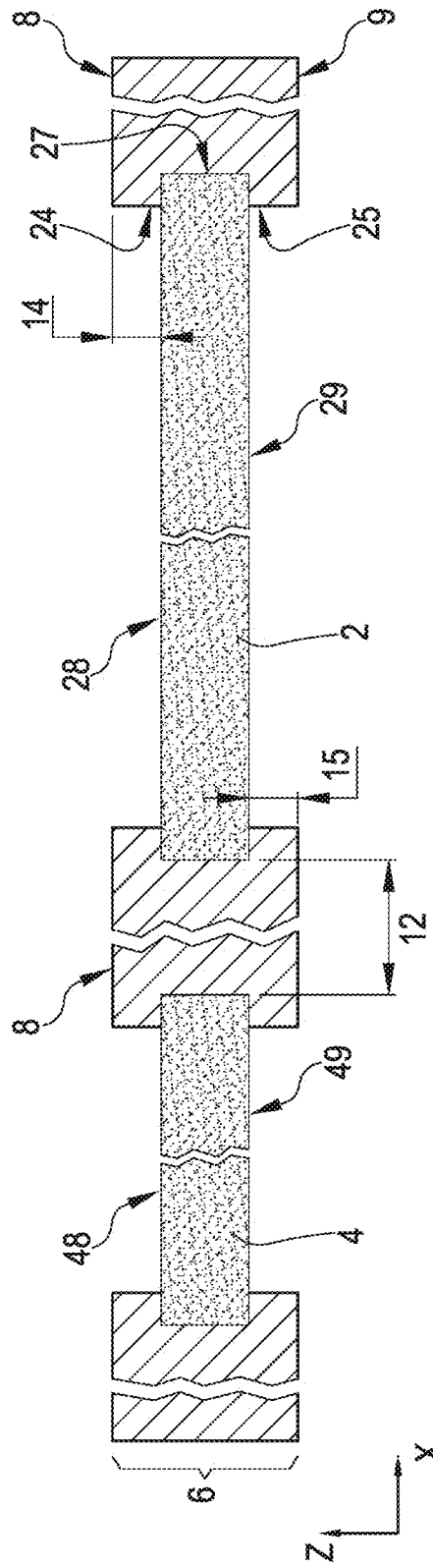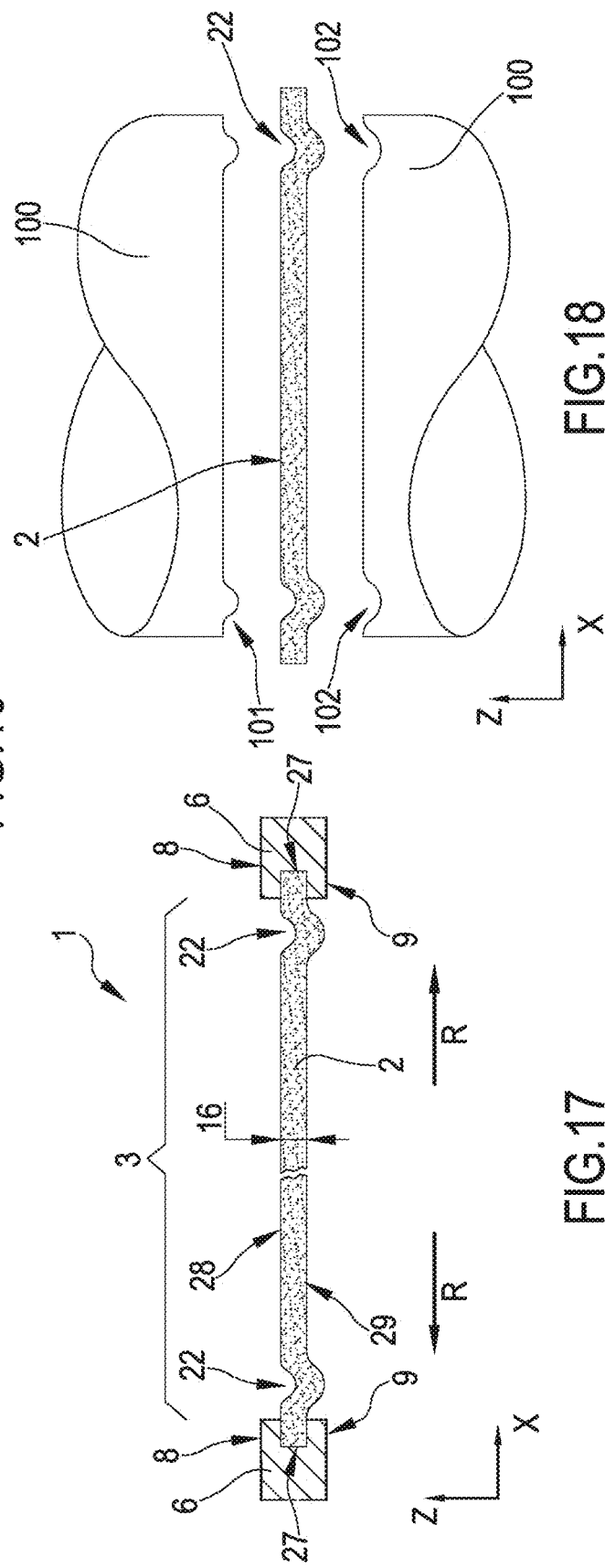

SUPPORT FOR CONSERVING SAMPLES OF BIOLOGICAL MATERIAL AND METHOD OF PRODUCTION THEREOF

CROSS-REFERENCE TO RELATED APPLICATION(S)

This application is a divisional of U.S. Ser. No. 16/768,432, filed May 29, 2020, which is a U.S. National Phase Application under 35 U.S.C. § 371 and claims the benefit of priority to International Application Serial No. PCT/IB2018/059440, filed Nov. 29, 2018, which claims priority to Italian Application Serial No. 102017000139132, filed Dec. 1, 2017, the contents of all of these applications are hereby incorporated by reference.

TECHNICAL FIELD

The concepts herein relate to a support for conserving samples of biological material, in particular a support comprising an absorbent matrix suitable for receiving and conserving the sample. The concepts herein further relate to the associated method for producing the support. The concepts herein have particular application for enabling, by a single support, the conservation of a sample of biological material and cleaning of a device suitable for taking a sample of biological material from the matrix support.

BACKGROUND

There are known supports for conserving samples of biological material comprising a matrix, usually made of absorbent material. The absorbent matrix can consist of a cellulose-based material, such as, for example, paper, particularly absorbent paper or filter paper, which can be specifically treated, in particular chemically, to enable the absorption and conservation of the collected samples of biological material.

Such types of paper are known, for example, from patent application WO9003959 (BURGOYNE). Transferring samples of biological material that have been collected by specific devices (e.g. swabs of varying nature, in particular, for example, flocked swabs) onto matrix supports of the type previously described is known. Following the transfer of the samples onto matrix supports, a portion of the sample can be taken from the matrix support, for example in order to be subsequently analysed. The step of taking a sample from the support can be carried out by a known sample-taking device, such as a punch or a manual or automatic punching machine suitable for separating a small portion of the matrix support from the support. A punching machine suitable for taking a sample of biological material from a matrix support made of paper is known, for example, from patent application WO2006056658 (LEHTINEN).

Sample-taking devices usually have one or more surfaces which, on entering into contact with the support for conserving biological material, are designed to remove a portion of a sample of biological material from the support. In particular, when the sample-taking device consists of a punch, the portion removed from the matrix can be disc-shaped. Following removal of a sample of biological material from the matrix support it is convenient and advisable to clean the surfaces responsible for taking it, in order to be able then to proceed to take a further sample of biological material by the same sample-taking device. Cleaning has the purpose of avoiding contamination, by the sample-taking device, of the subsequent support from which it is intended to take a further sample of biological material. Such contamination could occur, for example, due to the presence of biological residues and/or impurities on the surfaces of the sample-taking device designed to take the sample of biological material from the support. Cleaning a sample-taking device using a special cleaning support, distinct from the conservation support, is known. For example, if the device for taking a sample of biological material from a first support is a punch, in accordance with the known cleaning method, cleaning is performed by punching once, in a "blank" mode, a "virgin" cleaning support devoid of contaminants, in particular an absorbent matrix, so that the contact between the head of the punch and the second support allows the removal of biological residues and/or impurities present on the punch itself. In the context of the present description, "virgin" support refers to a matrix support, or a portion thereof, on which no sample of biological material has been deposited, whereas punching in a "blank" mode refers to the operation consisting in punching a virgin support in order to clean the punch. The known method is complex, as it requires manipulating both the conservation supports and the cleaning supports, which results in various drawbacks, including at least an increase in costs and a lengthening of processing times.

From document MI2013A001354, moreover, there is known a support for conserving samples of biological material comprising at least: a first portion of an absorbent matrix suitable and intended for conserving a sample of biological material and a second portion, distinct from the first portion and suitable for, configured and intended to constitute a cleaning zone for the head of a device, in particular a punch, suitable for taking a sample of biological material from the first portion. The support can further comprise a third portion interposed between the first portion and the second portion; the third portion can have one or more notches or one or more openings.

The paper supports of a known type described above show some drawbacks.

In particular, such paper supports are bendable and do not have any appreciable rigidity; in manipulation with automatic loaders, automatic manipulators and/or punching machines, bending of the supports may thus occur, which may thus lead to malfunctions. It should be further considered that in automatic loaders, the spaces are limited, and hence there is a need for great precision in positioning and manipulation by the completely automated systems.

SUMMARY

The present disclosure encompasses a support for conserving one or more samples of biological material which enables one or more of the above-described drawbacks to be overcome.

Further aspects combinable with one or more of the appended claims and/or with one another will be described below.

In accordance with a first aspect, there is provided a support for conserving a sample of biological material, the support comprising at least:
  a substantially rigid body made of moulded or co-moulded or overmoulded plastic material, comprising at least a first through opening;
  at least a first portion of an absorbent matrix made of a material comprising cellulose, suitable and intended for conserving a sample of biological material; the first portion of absorbent material being fixed and maintained in a predetermined position within the first through opening;

wherein the first portion has at least a first part without support from the body and which is suspended inside the first through opening, the first part being directly accessible to contact.

The use of a substantially rigid material to produce the body of the support enable greater precision in positioning the support inside automatic loaders and reduces the risk of errors or malfunctions in the manipulation and punching of the first portion.

In accordance with a second non-limiting aspect, the first portion of the absorbent matrix is made of a material comprising cellulose.

In accordance with a third non-limiting aspect, the absorbent matrix, made of a material comprising cellulose, is in particular absorbent paper or filter paper. Optionally, the absorbent paper or filter paper is specifically treated, in particular chemically, to enable the absorption and conservation of the collected samples of biological material.

In accordance with a fourth non-limiting aspect dependent on the aforesaid third aspect, the chemical treatment is a preserving chemical treatment, in particular DNA-compatible.

The use of a preserving chemical treatment, in particular a DNA-compatible one, advantageously enables biological samples conserved for a long time to be maintained on the first portion of the absorbent matrix.

In accordance with a fifth non-limiting aspect, the absorbent matrix is a matrix insoluble in liquid.

In accordance with a sixth non-limiting aspect, the absorbent matrix is a dimensionally stable matrix.

The use of a dimensionally stable matrix makes it possible to prevent or in any case reduce the risk of accidental contact at least of the first portion with potentially contaminating surfaces, especially in the case of superposition or juxtaposition of a number of supports. Such potentially contaminating surfaces are the surface of the body of other supports, and/or other first portions of other supports, or walls of storerooms, or components of automatic manipulation and punching systems.

In accordance with a seventh non-limiting aspect, the support further comprises at least a second portion, separate from the first portion and suitable for, configured and intended to constitute a cleaning zone for the head of a device, in particular a punch, suitable for taking a sample of biological material from the first portion; the second portion of absorbent material being maintained in a predetermined position within a second through opening.

In accordance with an eighth non-limiting aspect, the first portion comprises a second lateral part in contact and/or in adhesion, and in particular surrounded by the body.

In accordance with a ninth non-limiting aspect, the first portion of the absorbent matrix is maintained in a predetermined position within the first through opening at least by contact and/or adhesion between the second lateral part and the body.

In accordance with a tenth non-limiting aspect, the second portion is a second portion of an absorbent matrix maintained in a predetermined position within a second through opening at least by contact and/or adhesion between a second lateral part and the body.

In accordance with an eleventh non-limiting aspect, the second portion is separated from the first portion by a part of the body.

In accordance with a twelfth non-limiting aspect, the absorbent matrix of the second portion is physically separated from the absorbent matrix of the first portion. In a variant, the two portions of the absorbent matrix could consist of a single portion.

In accordance with a thirteenth non-limiting aspect, at least the first portion of the absorbent matrix has a thickness that is smaller than or equal to a thickness of the body.

The difference in thickness between the first portion of the absorbent matrix and the body contributes to increasing the certainty of isolating the first portion from accidental contacts, which could contaminate the biological sample in use contained therein.

In accordance with a fourteenth non-limiting aspect, the thickness of the body is equal to or greater than 0.8 mm or 1.0 mm, more preferably comprised in the interval of 1.2 mm-1.4 mm, optionally substantially equal to 1.3 mm, and/or equal to or less than 3.0 mm, more preferably 2.0 mm and/or the thickness of the first portion of the absorbent matrix is equal to or greater than 0.2 mm or 0.4 mm, more preferably 0.5 mm or 0.6 mm and/or equal to or less than 1 mm, more preferably 0.8 mm.

In accordance with a fifteenth non-limiting aspect, the body identifies at least a first profile of discontinuity of thickness in a zone of proximity to the first portion of the absorbent matrix.

In accordance with a sixteenth non-limiting aspect, the body identifies at least a first profile of discontinuity of thickness in a zone of proximity to the second portion.

In accordance with a seventeenth non-limiting aspect, alternative to the preceding eleventh non-limiting aspect, the body identifies at least a first profile of discontinuity of thickness and a second profile of discontinuity of thickness in a zone of proximity to the first portion of the absorbent matrix.

In accordance with a preferred, non-limiting eighteenth aspect, the first profile of discontinuity of thickness is at the first surface of the first portion.

In accordance with a nineteenth preferred, non-limiting aspect, the second profile of discontinuity of thickness is at the second surface of the first portion.

In accordance with a twentieth preferred, non-limiting aspect, part of the body overlaps part of the first face or surface and of the second face of the first portion of the absorbent matrix and the portions of the body overlapping the first portion of the absorbent matrix create a stop impeding the axial mobility of the first portion of the absorbent matrix relative to the body.

The creation of a stop impeding the axial mobility of the first portion relative to the body makes it possible to have a great safety of positioning, and helps to maintain the first portion in its through opening even following punching.

In accordance with a twenty-first preferred, non-limiting aspect, the body is a substantially planar body extending mainly along a first and a second direction respectively identified by a first reference axis (X) and a second reference axis (Y) identifying an upper face and a lower face opposite the upper face, wherein the first and second through openings have an axis that extends substantially along a direction identified by a third reference axis (Z) orthogonal to the first reference axis (X).

In accordance with a twenty-second preferred, non-limiting aspect, said first face and said second face are substantially parallel to the upper face and/or to the lower face.

In accordance with a twenty-third preferred, non-limiting aspect, the body comprises a first portion and a second portion overlapping each other in the direction identified by the third reference axis (Z) and enclosing the second lateral part of the first portion of the absorbent matrix constrained to the body.

In accordance with a twenty-fourth preferred, non-limiting aspect, the body comprises a first portion and a second portion overlapping each other and made of a plastic material, in particular by moulding or co-moulding or overmoulding.

In accordance with a twenty-fifth preferred, non-limiting aspect, the body comprises a first portion and a second portion overlapping each other and made of a plastic material, joined to each other seamlessly and/or indissolubly and/or so as to form a monolithic and/or integral piece, in particular as a result of a moulding or co-moulding or overmoulding process. In accordance with a twenty-sixth preferred, non-limiting aspect, the impediment to axial mobility is an impediment along the third reference axis (Z).

In accordance with a twenty-seventh preferred, non-limiting aspect, the support comprises a radio-frequency identification chip comprising at least one memory suitable for containing electronic data.

In accordance with a twenty-eighth preferred, non-limiting aspect, the radio-frequency identification chip is integrated within the body.

The use of a radio-frequency identification chip enables data relating to the support itself to be maintained in a safe and mechanically inaccessible manner. In particular, the radio-frequency identification chip can contain data that replace or duplicate data typically recorded by ink or engraving directly on the body of the support. The use of a radio-frequency identification chip further enables access to data taken from a large plurality of supports without any need to handle or manipulate them. The reduction in the number of handling operations or manipulations for reading data contributes to reducing the risk of accidental contaminations at least of the first portion of the absorbent matrix.

In accordance with a twenty-ninth preferred, non-limiting aspect, said memory comprises at least one non-rewritable portion.

The first non-rewritable portion can be advantageously used to memorise a unique identification number of the support, making it possible to keep track of it over time without the risk of duplications or fraudulent modifications.

In accordance with a thirtieth preferred, non-limiting aspect, the support, on the body thereof, comprises an identification profile for identifying correct manipulation, designed to enable identification of a specific orientation of the body and configured to be read by an optical reader and/or a mechanical stop of a manipulator device.

In accordance with a thirty-first preferred, non-limiting aspect, the identification profile for identifying correct manipulation is disposed at or substantially at the perimeter of the body.

The use of an identification profile for identifying correct manipulation makes it possible to increase the precision of positioning and gripping by the manipulators of the support.

In accordance with a thirty-second preferred, non-limiting aspect, the absorbent matrix comprises at least a third curved or bent part, for example made by die-cutting, configured to compensate at least for expansions or contractions, thermal or of another nature, of the plastic material of the body, the third part being optionally fashioned substantially at a perimeter of the absorbent matrix.

The third part advantageously makes it possible to compensate for dimensional variations of the body of the support, thus preventing curvature or tearing of the absorbent matrix.

In accordance with a thirty-third preferred, non-limiting aspect, said third part is fashioned in a junction zone between said absorbent matrix and the body.

In accordance with a further and thirty-fourth aspect, a production process for producing a support for conserving a sample of biological material is provided, the process comprising:

A step of defining a predefined shape for at least a first portion of an absorbent matrix suitable and intended for the conservation of a sample of biological material;

A step of positioning the at least a first portion of the absorbent matrix in a mould, and of retaining the first portion of the absorbent matrix in a predetermined position in the mould;

A step of moulding or co-moulding or overmoulding plastic material in empty spaces of the mould, after which a body for retaining the at least a first portion of the absorbent matrix is obtained, wherein the body retains said first portion of the absorbent matrix at least in the second lateral part thereof; and wherein After the moulding or co-moulding or overmoulding step, said first portion has a portion of a first face and of a second face that are directly accessible.

In accordance with a thirty-fifth preferred, non-limiting aspect, after the moulding step, the body assumes a substantially planar shape, extending along a first and a second direction respectively defined along a first reference axis (X) and a second reference axis (Y) orthogonal to the first reference axis.

In accordance with a thirty-sixth preferred, non-limiting aspect, the body has a thickness, measured along a third reference axis (Z) orthogonal both to the first and the second reference axis, which is greater than or equal to the thickness of the first portion of the absorbent matrix.

In accordance with a thirty-seventh preferred, non-limiting aspect, the body has a thickness equal to at least 0.8 mm or 1 mm, identifying at least a first profile of discontinuity of thickness in a zone of proximity to said first portion of the absorbent matrix.

In accordance with a thirty-eighth preferred, non-limiting aspect, alternative to the preceding thirtieth aspect, the body identifies a first profile of discontinuity of thickness at the first face of the first portion of the absorbent matrix and a second profile of discontinuity of thickness at the second face of the first portion of the absorbent matrix, substantially where the body at least partially overlaps the first face and the second face.

In accordance with a thirty-ninth preferred, non-limiting aspect, the step of making a first portion of an absorbent matrix having a predefined shape and suitable and intended for the conservation of a sample of biological material, comprises a step of selecting a material comprising cellulose.

In accordance with a fortieth preferred, non-limiting aspect, the material comprising cellulose is of a preserving, in particular DNA-compatible, type.

In accordance with a forty-first preferred, non-limiting aspect, the absorbent matrix has thickness comprised in the interval between 0.2 mm and 1 mm and preferably between 0.4 mm and 0.8 mm.

In accordance with a forty-second preferred, non-limiting aspect, depending on the preceding thirty-ninth aspect, said cellulose has a thickness substantially equal to 0.6 mm.

In accordance with a forty-third preferred, non-limiting aspect, the process comprises A step of defining a predefined shape for a second portion that is separate from the first portion and suitable for, configured and intended to constitute a cleaning zone for the head of a device, in particular a punch, suitable for taking a sample of biological material from the first portion;

A step of positioning the at least a second portion in the mould, and retaining the second portion in a predetermined position in the mould;

Wherein in the step of moulding or co-moulding plastic material in empty spaces of the mould, a body for retaining the first portion of an absorbent matrix and retaining the second portion is obtained, wherein the body retains the first portion of the absorbent matrix and the second portion at least in a second lateral part thereof.

In accordance with a forty-fourth preferred, non-limiting aspect, after the moulding or co-moulding step, the second portion has a portion of a first face and of a second face that are directly accessible.

In accordance with a forty-fifth preferred, non-limiting aspect, a second body portion is moulded, or co-moulded or overmoulded at least partially over a first body portion in order to produce two preferably substantially planar portions overlapping each other.

In accordance with a forty-sixth preferred, non-limiting aspect, the first body portion and the second body portion are seamlessly and/or indissolubly joined and/or form a monolithic and/or integral piece, in particular as a result of a moulding or co-moulding or overmoulding process.

In accordance with a forty-seventh preferred, non-limiting aspect, the first portion of the absorbent matrix is a portion of thin, flexible, non-weight-bearing material.

In accordance with a forty-eighth preferred, non-limiting aspect, the second portion is a portion of thin, flexible, non-weight-bearing material.

The use of a first and/or second portion of thin, flexible, non-weight-bearing material enables a great ease of perforation by a punching machine, in particular if the perforation takes place in a direction that is parallel or substantially parallel to the direction identified by the third reference axis.

In accordance with a forty-ninth preferred, non-limiting aspect, the aforesaid process comprises a step of producing a compensator to compensate for at least the expansion or contraction, for example thermal, of the body and/or of the first portion of the absorbent matrix, wherein said compensator is produced in the at least a first portion of the absorbent matrix.

In accordance with a fiftieth preferred, non-limiting aspect, depending on the aforesaid forty-fifth aspect, the step of producing said compensator comprises a step of producing at least a third curved or bent part, for example made by die-cutting, on the absorbent matrix.

In accordance with a fifty-first preferred, non-limiting aspect, the third part comprises an undulation and/or bending of the absorbent matrix suitable for defining a locally non-planar profile, and configured to stretch out and/or contract or bend when the body changes in its dimensions due to expansion or contraction, either thermal or of another nature, and/or when the first portion of the absorbent matrix undergoes expansions or contractions following the deposition of the sample of biological material.

In accordance with a fifty-second preferred, non-limiting aspect, the process comprises a step of positioning the absorbent matrix between two retaining devices whose surfaces are of a matching shape, so as to create the third part, prior to the step of introducing the plastic material into the mould.

In accordance with a further aspect, or fifty-third aspect, a device for the analysis of biological samples is provided, the device being characterised in that it comprises an apparatus for gripping a support for conserving one or more samples of biological material, and a sample-taking device, in particular a punch, comprising at least a first operating configuration in which at least one portion thereof enters into contact with said first portion of the absorbent matrix and takes a part of the latter.

In accordance with a fifty-fourth preferred, non-limiting aspect, the punch comprises at least a first operating configuration in which at least one portion thereof perforates said first portion.

In accordance with a fifty-fifth preferred, non-limiting aspect, the punch comprises at least one operating configuration in which at least one portion thereof perforates said first portion in a direction parallel or substantially parallel to the third reference axis (Z).

In accordance with a fifty-sixth non-limiting aspect, the sample-taking device, in particular a punch, further comprises a second operating configuration in which at least one portion thereof enters into contact with said second portion, carrying out an operation of cleaning and/or disinfection.

In accordance with a fifty-seventh non-limiting aspect, the sample-taking device is configured to position itself in the second operating configuration before being configured in the first operating configuration.

In accordance with a fifty-eighth non-limiting aspect, the support can comprise spacers, disposed on the upper or the lower face of the body and suitable for spacing further supports positioned side by side or stacked on top of one another.

In accordance with a fifty-ninth non-limiting aspect, the body is made in one piece and/or in a single piece.

In accordance with a sixtieth non-limiting aspect, the support can comprise a plurality of first portions of an absorbent matrix, intended for the conservation of samples and fixed and maintained in a predetermined position, each within a respective, corresponding and distinct first through opening of the body.

In accordance with a sixty-first non-limiting aspect, the support can comprise a plurality of second portions of an absorbent matrix which are suitable for, configured and intended to constitute cleaning zones for the cutting head of a punch and fixed and maintained in a predetermined position, each within a respective, corresponding and distinct second through opening of the body.

In accordance with a sixty-second non-limiting aspect, the support can comprise a plurality of radio-frequency identification chip and/or a plurality of identification profiles.

In accordance with a sixty-third non-limiting aspect, the first through opening and/or the second through opening can have a circular shape or a square shape or any shape whatsoever that it is suited to the purpose.

In accordance with a sixty-fourth non-limiting aspect, the disclosure further relates to the use of a support, in accordance with what was claimed and/or specified in the preceding aspects, for the deposition of biological samples and/or for conserving biological samples and/or in a machine for the automatic treatment of supports for biological samples and/or in an automated storage system for the treatment of supports for biological samples and/or for taking biological samples by punching the first portion of an absorbent matrix and/or for cleaning a cutting head of a punch by punching the second portion of an absorbent matrix or material suitable for cleaning.

For the purposes of the present disclosure, moulding, co-moulding and overmoulding exclude mechanical juxtapositions of parts made of a plastic material which are both already solidified, in particular removable or in any case individualising juxtapositions, in particular a finished product, a joining portion where two pieces of plastic material are not indissolubly and seamlessly joined.

DESCRIPTION OF THE FIGURES

A detailed description of one or more preferred embodiments will now be provided by way of non-limiting example, in which:

FIG. 4 illustrates a sectional view of a specific embodiment of the support in FIG. 1, along the line IV-IV drawn in FIG. 2;

FIG. 5 illustrates a detailed sectional view of part of the support in FIG. 1;

FIG. 16 illustrates a sectional view of the support as made after the process schematically illustrated in FIG. 14 and in FIG. 15;

FIG. 17 illustrates a sectional view of part of the support, in an intermediate construction configuration relative to the final construction; and FIG. 18 illustrates a side view of a part of a device for making the support of the concepts herein, in a particular configuration thereof.

DETAILED DESCRIPTION

With reference to the appended figures, the reference number 1 denotes in its entirety a support for conserving one or more samples of biological material.

The support 1 comprises at least an absorbent matrix 2, where absorbent matrix 2 refers to a matrix support or any other support suitable and intended for the collection and in particular the conservation of samples of biological material.

Figure 1:
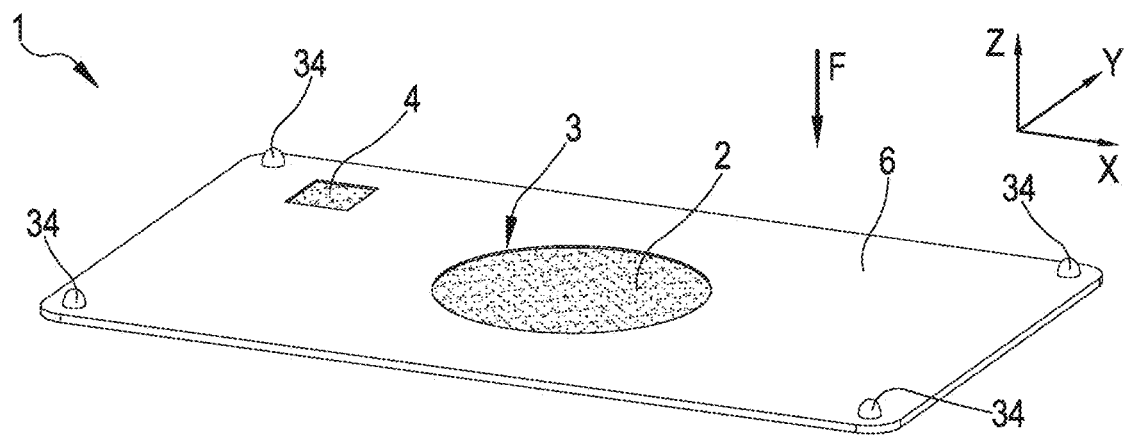
FIG. 1 illustrates a perspective view of a first preferred and non-limiting embodiment of the support 1 for conserving one or more samples of biological material described herein.

As illustrated in the appended figures, and in particular in FIG. 1, the support 1 comprises a substantially rigid weight-bearing body 6, which serves as a support for the absorbent matrix 2.

The support 1 further comprises at least a first portion 3 and a second portion 4, preferably likewise made with an absorbent matrix 2. For the purposes of the present disclosure, the aforesaid first portion 3 and the second portion 4 are portions of heterogeneous material, which is in particular distinct from the material the body 6 is made of.

The first portion 3 of the absorbent matrix 2 is suitable and intended for the absorption and conservation of a sample of biological material and can be chemically treated in an appropriate manner to enhance the conservation of biological material, also for a long period of time. The conservation of samples of biological material is fundamental in applications in which there is a need to process the biological material collected, for example to perform subsequent analyses, even after a long period of time has elapsed since the moment when the sample to be analysed was deposited on the absorbent matrix 2.

The second portion 4 is suitable for and configured to constitute a cleaning zone for the surfaces of the sample-taking device that have come into contact with the absorbent matrix 2, in particular in the first portion 3, upon the taking of a sample of biological material. In particular, said surfaces can belong to the head of a sample-taking device. The Applicant stresses that the "sample-taking device" described in this paragraph is not the device with which the biological sample is taken in order to be deposited on the absorbent matrix 2, but rather a device—for example an electromechanical device—conceived to take a part of the absorbent matrix 2, in particular of the first portion 3, in order to enable laboratory tests to be performed on the biological sample supported thereupon.

In the context of the present description, head of a sample-taking device refers to one or more surfaces and/or portions of the sample-taking device suitable for removing a sample of biological material from the absorbent matrix 2, in particular in the first portion 3 of the absorbent matrix 2. For example, in the event that the sample-taking device is a punch, the surfaces suitable for coming into contact with the biological material in the first portion 3 in order to remove a sample therefrom belong to the head of the punch. If the sample-taking device is a punch, it can be cleaned by punching, in a "blank" mode, the second portion 4 one or more times so that the material the second portion 4 is made of can remove the residues of biological material and/or the impurities on the surfaces of the sample-taking device suitable for taking portions of samples of biological material from the support 1.

In order to complete the cleaning efficiently and avoid contaminating the sample-taking device, no sample of biological material is deposited in the second portion 4 for the purpose of conserving it, so that the second portion 4 is maintained virgin.

The second portion 4 can be made of an absorbent material or any other material capable of cleaning the head of the sample-taking device when in contact with it. In particular, the second portion 4 can be made with the same absorbent matrix 2.

The first portion 3 and the second portion 4 can be made of a same material or different materials and/or have characteristics differing among them, acquired, for example, through one or more specific processes to which they have been subjected.

In particular, the first portion 3 can be configured, for example by adding specific substances suited to the purpose, to absorb and conserve samples of biological material, whereas the second portion 4 can be configured to absorb and/or remove residues of biological material and/or impurities present on the surfaces of the sample-taking device suitable for taking portions of samples of biological material from the support 1.

Figure 2:
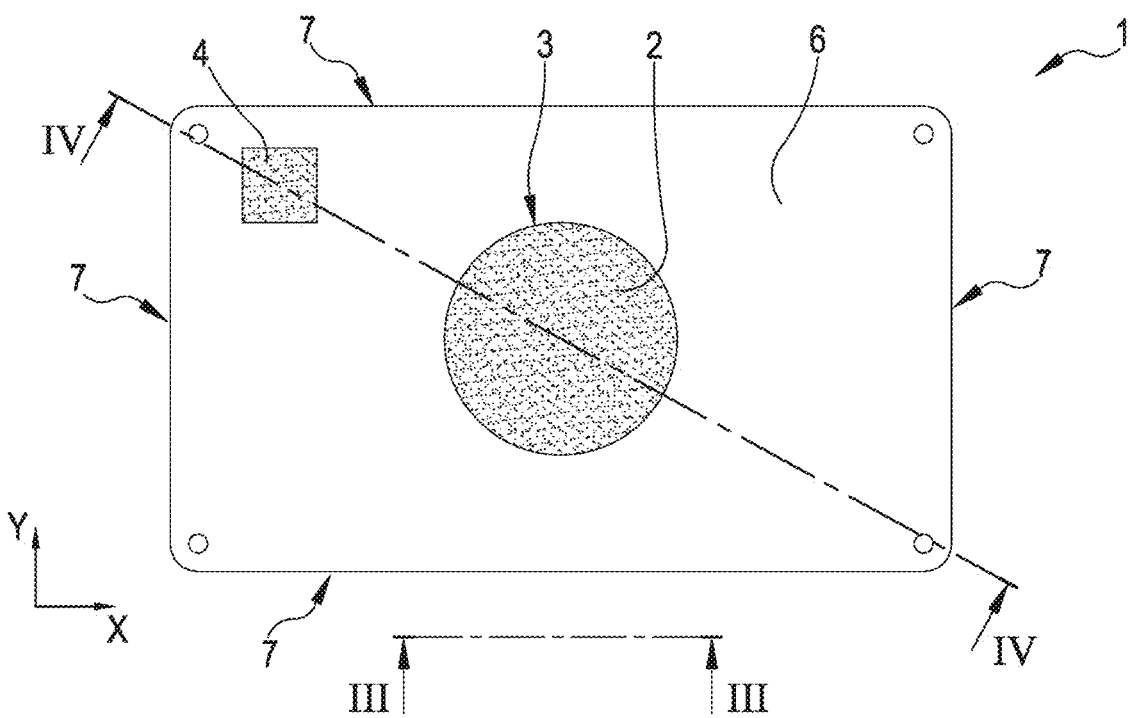
FIG. 2 illustrates a plan view of the support in FIG. 1, observed along the direction of observation indicated by the arrow F.

As illustrated in FIG. 1 and in FIG. 2, the body 6 of the support 1 completely encloses the first portion 3 and the second portion 4; the first portion 3 and the second portion 4 are each separated from the edge or perimeter of the body 6 by a part or portion of body 6. The Applicant has observed that the manipulation of the body 6 can take place by gripping the perimeter of the body 6 itself; this gripping can also be performed by the user manually, or by a robotised device, according to an automatic method. The portion of the body 6 that separates the perimeter of the support 1 at least from the first portion 3, measured along the plane X-Y defined by the first and second reference axes, measures at least 5 mm and, more preferably, at least 7 mm or at least 10 mm. Thanks to this aspect, it is possible to avoid accidental contaminations above all of the first portion 3 of the absorbent matrix 2 when the body 6 is manipulated.

As illustrated in the appended figures, the body 6 of the support 1 for conserving a sample of biological material extends mainly along a first and a second direction respectively identified by a first reference axis X and a second reference axis Y, preferably with a planar shape. The first and second directions respectively identify a length and a width of the body 6. The body 6 further extends along a third direction identified by a third reference axis Z, orthogonal to the first reference axis X and to the second reference axis Y; the third direction identifies a thickness of the body 6. The body 6 thus identifies an upper face or first surface 8 and a lower face or second surface 9, opposite the first surface and, in particular, preferably parallel thereto.

The body 6 further identifies a lateral surface 7 which defines the perimeter of the body itself; said surface extends substantially along planes comprising at least the third reference axis Z; when the body 6 has a rectangular shape, as in the case of the embodiment in the appended figures, the planes along which the lateral surface 7 extends are in twos, comprising the first and the third reference axes X, Z, and the second and third reference axes Y, Z.

Figure 6:
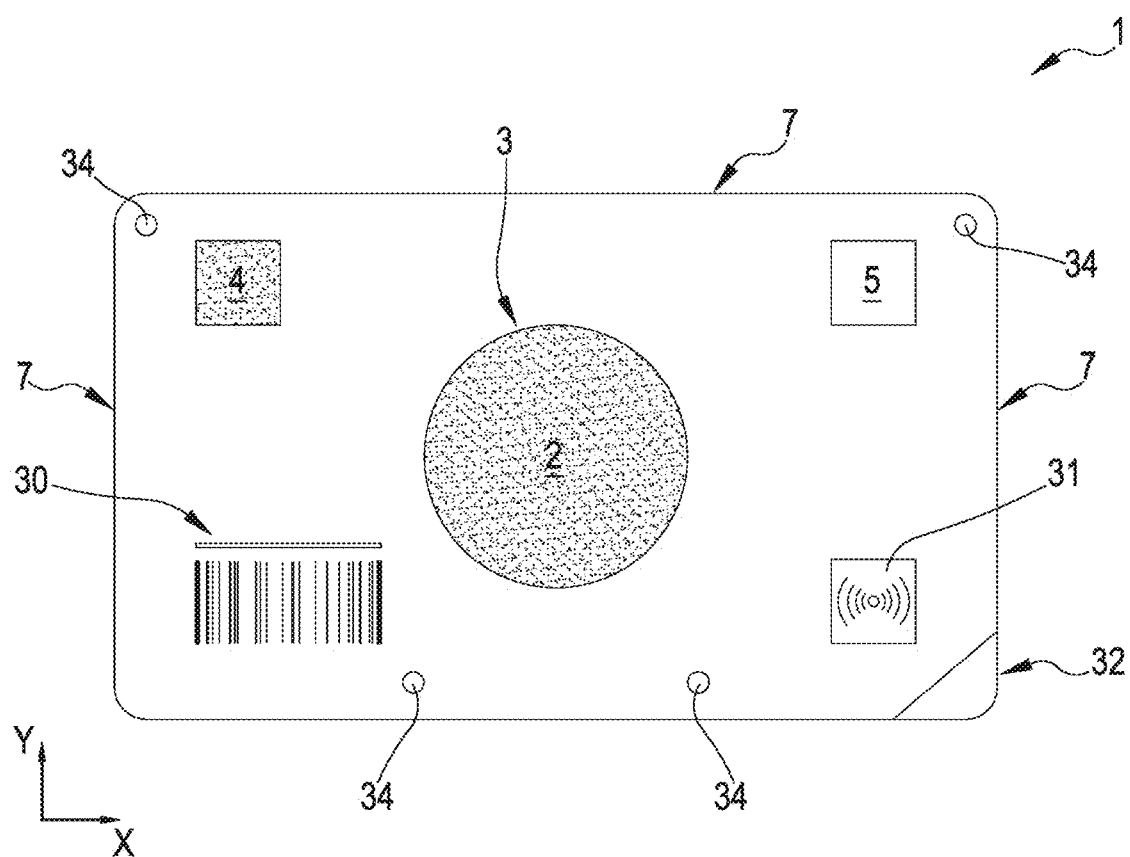
FIG. 6 illustrates a plan view of a second preferred and non-limiting embodiment of the support 1 for conserving one or more samples of biological material described herein.

The support 1 can further comprise a third portion 5. In an unillustrated variant, the third portion 5 can be interposed between the first portion 3 and the second portion 4, and preferably be a connecting portion between the first portion 3 and the second portion 4. In the embodiment illustrated in FIG. 6, the third portion 5 is not interposed between said portions. The third portion 5 is advantageously a portion of the absorbent matrix 2. The body 6 preferably comprises a third through opening in which the third portion 5 is housed, as illustrated in FIG. 6. In a preferred embodiment, the third portion 3 can be suitable for and intended to constitute a calibration portion of the device for taking the sample from the first portion, and, in greater detail, it can be intended to enable a verification of a colorimetric difference existing between areas in which the sample of biological material is deposited and areas without any biological sample. The colorimetric difference is emphasised, in particular, when the material of the first portion changes colour after the sample of biological material has been deposited, for example as a result of the characteristics of the sample and/or the presence of appropriate chemical substances on the first portion.

The first portion 3 and/or the second portion 4 and/or the third portion 5 and/or the absorbent matrix 2 can preferably be made of a cellulose-based material and/or made of a paper material, for example absorbent paper or filter paper.

The absorbent matrix 2 can preferably be made of a cellulose-based material, for example made of a paper material, absorbent paper or filter paper in particular. More in particular, the absorbent matrix can consist of a cellulose-based material, such as, for example, paper, absorbent paper or filter paper in particular, which can be specifically treated, in particular chemically, to enable the absorption and conservation of the collected samples of biological material. The chemical treatment performed on the absorbent paper, if present, can preferably be a preserving chemical treatment, in particular a DNA-compatible one; for the purposes of the present disclosure, "preserving" treatment, in particular a "DNA-compatible" one, should be understood as a treatment and/or material designed not to deteriorate the biological sample present on the absorbent paper, so as to be able to permit a correct analysis thereof at a later time following the moment in which the biological sample is collected. More in particular, "preserving" treatment, in particular a "DNA-compatible" one refers to a treatment and/or a material that does not alter the DNA structure of the sample, but can comprise a bactericidal action configured to stop or limit the proliferation of bacteria on the absorbent matrix 2. In fact, the absorbent matrix 2 can comprise or be totally or partially impregnated with a compound or composition for protecting DNA, comprising, by way of non-limiting example, an acid joined to a base; in particular, it can comprise uric acid joined to a weak base in order to convert the uric acid into salts and provide an alkaline environment.

With the aim of enabling the biological samples to be conserved for a long period, the absorbent matrix 2 is insoluble in liquids, specifically insoluble in biological liquids. Furthermore, preferably, but without limitation, the absorbent matrix 2 is made of a material, in particular absorbent paper or filter paper, which is dimensionally stable when impregnated by a liquid, particularly when impregnated by a biological liquid. By virtue of this aspect, since the absorbent matrix 2 is suspended, i.e. it possesses no support in the direction identified by the third reference axis Z for a substantial portion thereof, one avoids an excessive warping of the same after the absorption of the biological liquid in use held therein, thus preventing the risk that such warping may cause contact between the absorbent matrix 2 and other absorbent matrices or other bodies 6 of adjacent supports 1.

The support 1 for conserving biological material comprises an outer containing body 6, which is configured to house the first portion 3, the second portion 4 and/or the absorbent matrix 2 inside it, at least partially, and preferably completely. In other words, the body 6 can have one or more seats intended to house the first portion 3, the second portion 4 and, optionally, the third portion 5 and further portions if present. For the purposes of the present disclosure, "inside" refers to the fact that, at least when devoid of samples of biological material, the first portion 3 and in particular all of the portions 3, 4, 5, if present in a larger number than the first portion, do not extend outside the profile defined by the body 6.

As briefly mentioned above, in accordance with an important aspect, at least the first portion 3 made of an absorbent matrix 2 is positioned in a respective through opening 13 so as to be suspended for at least a portion thereof, preferably for a substantial portion thereof comprising at least 70% of the surface of the absorbent matrix 2. In a particular embodiment, the support 1 can be provided with a first completely suspended portion 3. In the suspended portion thereof, the aforesaid first portion 3 does not have the support of the body 6.

In particular, the first portion 3 has a lateral surface 7 extending along a plane that comprises the third reference axis Z, to which a first and a second face or surface 28, 29, respectively larger and smaller, are joined. The first and the second face or surface preferably lie in parallel planes, each of which comprises the first and the second direction identified by the first and second reference axes X, Y. In particular, at least one part or portion of the first and second face 28, 29 is suspended.

For the purposes of the present disclosure, "suspended" refers to the fact that at least a first portion 3 has no support lying below or above it in a direction identified by the third reference axis Z. "Partially suspended" refers to the fact that the at least a first portion 3, for at least a sub-portion thereof, and in particular a portion or part of the first and/or second face, has no support lying below or above it in a direction identified by the third reference axis Z. When the first portion is completely suspended, it is held solely by contact and/or adhesion in a second lateral part thereof extending over a plane or a number of planes, also continuously when the first portion 3 assumes the form of a curve with no angular points, comprising the third reference axis Z.

The surfaces of the first portion 3 other than the second lateral part 27 are preferably free, not interposed in a sandwich-like manner, and are thus directly accessible to contact. In the present text, the term "directly accessible to contact" refers to devoid of coverings of any kind, for example a film covering, and/or directly accessible for example for depositing samples or taking portions by a punch. The first portion 3 thus represents a first portion 3 of a single-layer absorbent matrix 2.

In particular, under operating conditions of the containing body 6, the first portion 3 and the second portion 4 can be disposed inside the body 6. "Operating conditions" of the body 6 refers to the condition in which at least the first portion 3 and the second portion 4 are disposed inside the body 6. In particular, under operating conditions of the body 6, the first portion 3 and the second portion 4 are suitably positioned inside the containing body 6 so that the first portion 3 is ready for the deposit of a sample of biological material for the conservation thereof or for the taking of a sample of biological material and the second portion 4 is ready for cleaning the sample-taking device. The first portion 3 and the second portion 4 can be distinct and/or applied individually to the support 1, in particular to the body 6.

Figure 3:
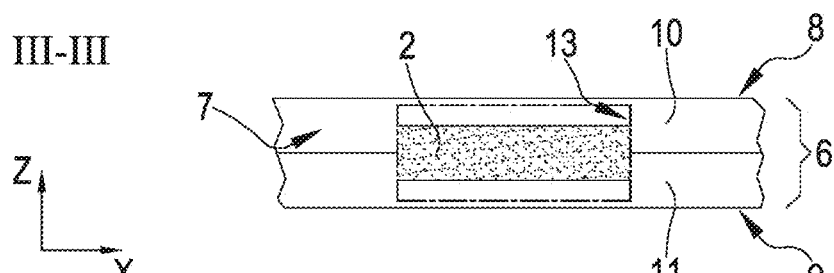
FIG. 3 illustrates a side view of part of the support in FIG. 1, along the line III-III indicated in FIG. 2.

As illustrated in FIG. 3 and in greater detail in FIGS. 4 and 5, a preferred and non-limiting embodiment of the support 1 can be provided with a body 6 that has an upper portion 10 and a lower portion 11 coupled to each other; in particular, along the direction identified by the third reference axis Z, the upper portion 10 is juxtaposed to or superimposed on the lower portion 11. The upper portion 10 and the lower portion 11 each have a respective thickness 17, 18 measured in a direction parallel to the direction identified by the third reference axis Z. More preferably, the upper portion 10 and the lower portion 11 of the body 6 are made integrally and/or indissolubly coupled to each other after a moulding or co-moulding or overmoulding process better described below.

The second portion 3 of an absorbent matrix 2 has its own thickness 16 measured in a direction parallel to the direction identified by the third reference axis Z. In particular, the thickness 16 measures less than the sum of the thicknesses of the upper portion 10 and lower portion 11; relative to the first and second surfaces 8, 9, in the second portion 3 of the absorbent matrix 2, the body 6 thus identifies at least a first profile of discontinuity of thickness, and in particular, in accordance with the embodiments represented in the appended figures, a first and a second profile of discontinuity of thickness 24, 25, each having respectively a first height 14 and a second height 15, both measured along a direction parallel to the direction identified by the aforesaid third reference axis Z.

In particular, it has been observed that the thickness 16 of the first portion 3 of the absorbent matrix 2 is preferably about 0.6 mm and more in general comprised in the interval [0.4-0.8] mm. This thickness has been observed to be the one with the best compromise between resistance and the capacity to absorb liquids or fluids. For this reason, the first portion of the absorbent matrix 2 is definable as a portion of a thin, flexible, non-weight-bearing material. For the purposes of the present disclosure, "non-weight-bearing" refers to a material that, in particular in the specific configuration of thickness defined previously, does not have characteristics such as to and is not configured to act as a support for itself or for further materials and/or layers, as it is substantially completely flexible or limp.

When the second portion 4 and/or the subsequent portions are present in the specific embodiment actually produced, and in particular when said at least a second portion 4 is also made of an absorbent matrix 2 as in the first embodiment, the thickness measurements previously mentioned for the first portion 3 are also applicable to the aforesaid at least a second portion 4.

The Applicant has further found that the first and second profiles of discontinuity of thickness 24, 25 are useful for enabling a number of supports 1 to be stacked without the respective first portions 3 of the absorbent matrix 2 touching one another. Although the presence of only one between the first and a second profile of discontinuity of thickness may be sufficient to enable a number of supports 1 to be stacked without the respective first portions 3 of the absorbent matrix 2 touching one another, the presence of a first and of a second profile of discontinuity of thickness ensures a larger margin, with a reduction in the risk of reciprocal contamination between two or more first portions 3 of the absorbent matrix 2 without contact, also when the absorbent matrix 2 bends due to the weight of the liquid or fluid absorbed. This solution also makes it possible to reduce the risk of contamination of the first portion 3 of the absorbent matrix 2 by the walls of the rack on which the supports 1 can be stacked.

In order to enable a support of sufficient sturdiness to be obtained, the overall thickness of the support 6, and hence the sum of the thicknesses 17, 18 of the upper portion 10 and the lower portion 11, is preferably equal to at least 1 mm, and preferably comprised in the interval 1.2 mm-1.4 mm, more preferably substantially equal to 1.3 mm. In FIG. 4 and in FIG. 5 an embodiment is illustrated in which the thickness of the upper portion 10 is equal to the thickness of the lower portion 11; for example, if the overall thickness of the support 6 is equal to 1.2 mm, each portion will have a thickness equal to 0.6 mm. However, it is possible to have an upper portion 10 with a thickness differing from the thickness of the lower portion 11.

Preferably, but without limitation, the dimensional ratio is substantially comprised in the interval between 1:1.25 (for example, thickness of the body 6 equal to 1 mm, thickness of the at least a first portion 3 equal to 0.8 mm) and 1:3.5 (for example, thickness of the body 6 equal to 1.4 mm, thickness of the at least a first portion 3 equal to 0.4 mm) or 1:5 (for example, thickness of the body 6 equal to 1.5 mm, thickness of the at least a first portion 3 equal to 0.3 mm).

The body 6 of the support 1 is preferably, but without limitation, made of a plastic material, and even more preferably made of a material susceptible of being moulded or co-moulded or overmoulded. After the moulding, co-moulding or overmoulding process, the body 6 of the support 1 assumes a structure that is integral or in a single body, wherein the plastic material with which the body is made is indissolubly bonded, extending continuously and/or uninterruptedly in particular along a direction substantially parallel to the Z axis, that is, through the thickness, in particular the entire thickness, of the body 6. In a preferred embodiment, the body 6 is made of a single piece. The plastic material is preferably crystal polystyrene, for example 100%. Non-limiting examples of plastic materials suitable for being moulded or co-moulded are polyolefin plastic materials, including polypropylene, or vinyl plastic materials, including polyvinylchloride, or else styrene or polyester-based plastic materials, including polycarbonate or polyethylene. Preferably, but without limitation, use is made of plastic materials with a low property of chemical interaction with the absorbent matrix 2, in particular when made of cellulose. This advantageously makes it possible to leave, above all, the first portion 3 free of contaminating agents as much as possible, even after particularly long storage.

The Applicant notes that, in particular for the first portion 3—suitable for accommodating the biological sample when in use—and, subordinately, for the at least a second portion 4—it is important that in the production process of the support 1 there be no interactions between the plastic material of the body 6 and the cellulose which is part at least of the absorbent matrix 2; for this reason, among the plastic materials described previously, it can be advisable to select plastic materials which, combined with a low chemical interaction with the absorbent matrix 2, also have a low moulding temperature, and in particular a moulding temperature that is less than or equal to a temperature at which the absorbent matrix 2 undergoes deterioration or damage. A low moulding temperature of the plastic material contributes to reducing the risk of widespread alteration in the chemical characteristics of the absorbent matrix 2, since, particularly in the junction zones, the absorbent matrix 2 will heat up less. It has been observed, in particular, that in the event that polyvinylchloride is the selected plastic material, correct moulding operations can be achieved with a temperature starting from 150° C. and up to 200° C.-210° C.

FIG. 6 illustrates an alternative embodiment of the support 1. In this alternative embodiment, in addition to the elements described previously, the body of the support 1 can have a unique identification code 30 integrated therewith, preferably, but without limitation, represented on the upper surface or first surface 8 of the body 6. More particularly, the unique identification code 30 can be represented by applying ink, preferably indelible or, alternatively, engraved, for example, by a laser. Thanks to this feature, each support 1 can be numbered or distinguished clearly from the others; this can benefit both the manufacturer of the support 1, because it can keep track of precisely which and how many supports 1 have been distributed among its various customers, and users. The latter will advantageously have the possibility of precisely selecting which, among the various supports at their disposal, is the one that is of interest. For example, the unique identification code 30 can be made in the form of a barcode or QR code or any further known code with graphic representation.

The support 1, as represented in FIG. 6, can likewise be provided with a radio-frequency identification chip 31. The radio-frequency identification chip 31 is preferably introduced inside the body 6, and even more preferably it is embedded therewithin, so that no part of it projects outside the profile of the support. The radio-frequency identification chip 31 can be of the semi-active or passive type, the latter alternative being the preferred one. The use of a radio-frequency identification chip 31 of a passive type enables the presence of a battery to be completely avoided and thus enables the chip to be energy independent from permanent power sources.

A memory of a non-volatile type may be conveniently accommodated within the radio-frequency identification chip 31, more preferably, but without limitation, one having at least one inalterable, i.e. non-rewritable portion; the unique identification code represented or representable on the body 6 is preferably memorised within that portion. The memorisation of the unique identification code inside the radio-frequency identification chip advantageously makes it possible to verify which and how many supports 1 are in the possession of a specific user or a specific customer by remote reading, in particular without direct access to the upper surface or first surface 8 of the body 6. This advantageously allows the possibility of reading the support 1 even if it is stacked or closed in a storeroom. Further portions of the memory can be writable by the user to memorise data of interest therein, preferably data relating to the biological sample contained in the absorbent matrix 2.

The radio-frequency identification chip 31 is preferably an RFID chip that can operate, for example, over a predetermined frequency—by way of non-limiting example, 134 kHz or 13.56 MHz. Conveniently, with the use of the frequency 13.56 MHz, particularly if the access protocol complies with standard ISO 14443 or 15693, it is possible to read the radio-frequency identification chip remotely over a maximum range of 10 cm (ISO 14443) or 1 m (ISO 15693). The limitation of the maximum range for reading the radio-frequency identification chip advantageously makes it possible to prevent ill-intentioned persons from being able to remotely read the data contained in supports 1 that do not belong to them. In order to increase security in the reading of the electronic data contained in the memory of the radio-frequency identification chip 31, it is likewise possible for the electronic data to be encrypted.

Furthermore, the support 1 can comprise an identification profile for identifying correct manipulation. In a preferred and non-limiting embodiment, the identification profile 32 for identifying correct manipulation, illustrated in FIG. 6, is preferably, but without limitation, disposed at or substantially at the perimeter of the body 6. The identification profile 32 for identifying correct manipulation can advantageously comprise an asymmetric lateral perimeter; in particular, an embodiment of the support 1 that has a bevelled corner at the lateral surface 7 is represented in FIG. 6. The identification profile 32 for identifying correct manipulation is conveniently usable as a mechanical and/or optical stop profile. More in particular, the Applicant has observed that the identification profile for identifying correct manipulation can be "read" by a mechanical stop present on an automatic device for manipulating the support 1 and/or be automatically recognised by an optical reader for reading the same support 1.

Finally, the support 1 can comprise spacers 34 disposed on the upper surface or first surface 8, suitable for enabling a further separation of the same surface, and thus at least also of the first portion 3, from further surfaces and/or portions of supports 1 placed side by side or stacked in the direction identified by the third reference axis Z. In a preferred and non-limiting embodiment, the spacers 34 assume a dome shape. Preferably, but without limitation, the spacers 34 are disposed alternatively either on the upper surface 8 or lower surface 9 of the body 6; by positioning the spacers on only one face of the body 6, one prevents the possibility of the spacers 34, in particular when a number of supports 1 are stacked along the direction identified by the third reference axis Z, coming into reciprocal contact, thus leading to a misalignment of the supports 1. Alternatively, the spacers 34 can be positioned on both the upper surface 8 and lower surface 9 of the body 6, but in such a configuration it is advisable that the spacers 34 present on the upper face 8 not be aligned—in the direction identified by the third reference axis Z—with the spacers 34 present on the lower surface 9.

The production of the support 1 to which the present disclosure relates follows the process described here below.

Figure 7:
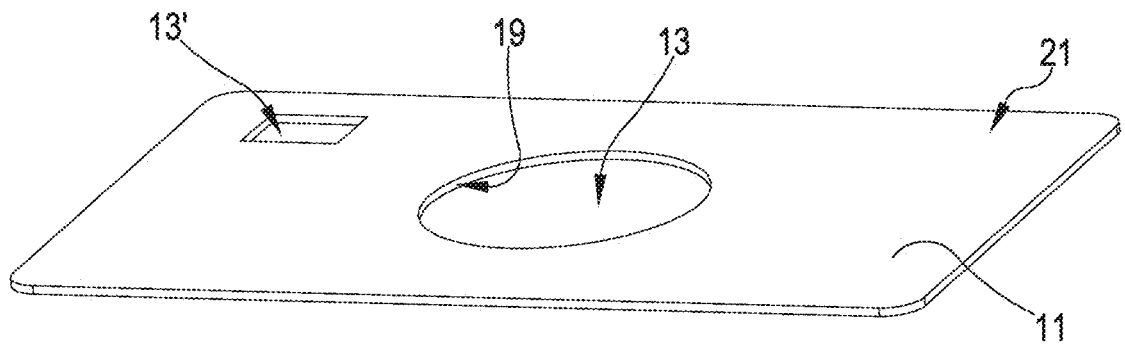
FIG. 7 illustrates a perspective view of part of the support in FIG. 1, in an intermediate step in the production of a variant embodiment.
Figure 8:
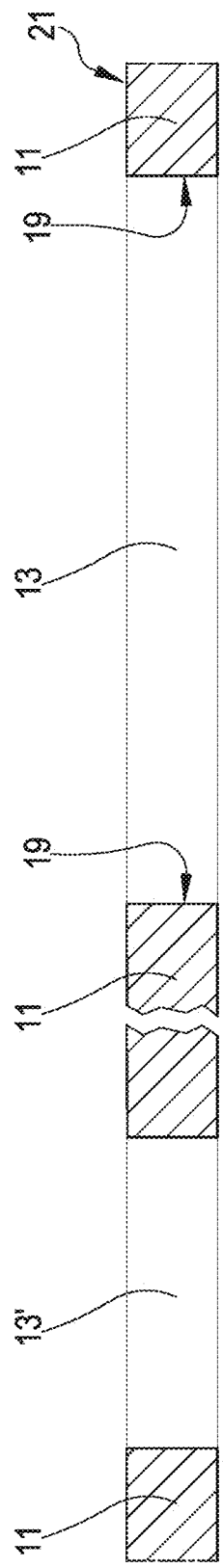
FIGS. 8, 9, 10 illustrate sectional views of intermediate production steps for the support 1, according to a first production technique.

As illustrated in FIG. 7 and in FIG. 8, a first step of the production process for producing the support 1 can comprise making a base or lower portion 11 made of a plastic material, and fashioning at least a first through opening 13 therein in a predetermined zone in which the first portion 3 of the absorbent matrix 2 will subsequently be positioned. Further steps of the production process for producing the support 1 can comprise making a number of seats 13 in predetermined zones in which the second portion 4 and/or the third portion 5 will be positioned, if present in the support 1 as conceived for the specific use. These steps are thus optional and depend on the number of portions included in the support 1. In particular, FIG. 8 illustrates this step of the process for an embodiment of the support 1 configured to include a first portion 3 and a second portion 4; the number of seats 13 is therefore equal to two. In the case of the embodiment of FIG. 6, there are three seats 13.

The seats 13 for the first portion 3, the second portion 4 and/or the third portion 5 are made in such a way as to be separate from one another, thus allowing a part of the body 6 to act as a guard interval 12. Preferably, but without limitation, the guard interval is not less than 2 mm and it is preferably not less than 4 mm. In this manner, the second portion 4 and/or third portion 5 will also be separate from each other so as to avoid reciprocal contaminations, also in the event of partial, incorrect and/or imprecise positioning of the portions themselves.

Figure 9:
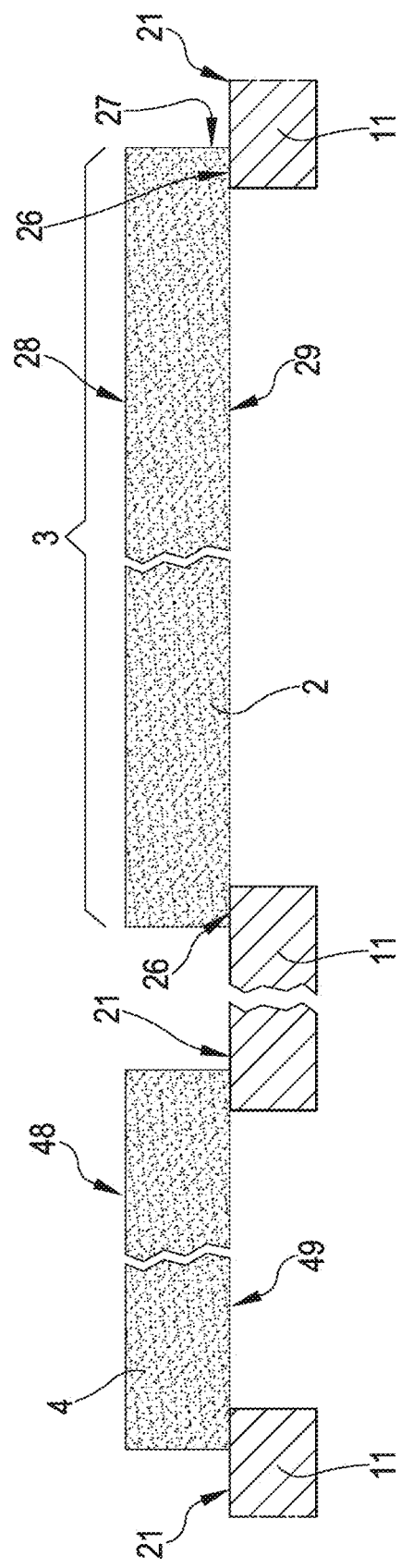

The absorbent matrix 2 is subsequently positioned over the through opening 13 in the predetermined zone for the placement of the first portion 3 of the absorbent matrix 2, and retained by a retaining device. Alternatively, the absorbent matrix 2 can be retained by gluing a peripheral area thereof 26 overlapping the upper face 21 of the lower portion 11. Advantageously, in order to make this overlap possible, the absorbent matrix 2 is first cut or in any case produced in such a way as to exceed the dimensions of the respective through opening 13. FIG. 9 illustrates this step for an embodiment of the support 1 that comprises a first portion 3 and a second portion 4. In this case, the second portion 4, too, is retained by a retaining device or is alternatively glued onto a peripheral area thereof overlapping the upper face 21 of the lower portion 11.

The production process for producing the support 1 subsequently comprises a step of positioning the upper portion 10 of the body 6 on the assembly formed by at least the first portion 3 of absorbent matrix 2 and the lower portion of the body 6. In greater detail, the positioning step comprises a moulding or co-moulding or overmoulding a plastic material on the support formed by the lower portion 11 of the body 6. For the purposes of the present disclosure, "moulding" refers to a technique which can comprise injection or compression moulding or rotational moulding, or another technique suited to the purpose, and preferably consists in injection moulding, in order to join the upper portion 10 and the lower portion 11 indissolubly through at least a mechanical joining leading to the definition of a structure that, especially once cooled, is definable as having been made monolithically and/or is definable as "monolithic", and extends seamlessly along the axis Z.

Figure 10:
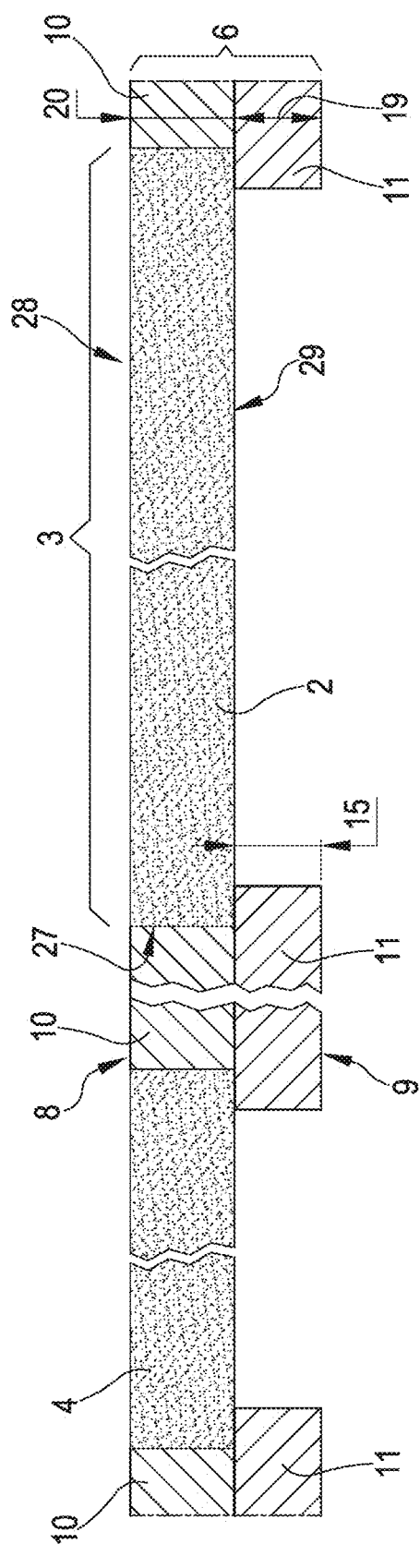

Through this step, which is schematically represented in FIG. 10, the upper portion 10 of the body 6 is deposited or moulded at least around the area identified by the first portion 3 of the absorbent matrix, in particular by entering into contact at least with the second lateral part 27 thereof. If the upper portion 10 of the body 6 is deposited or moulded in such a way as to enter into contact with the second lateral part 27 of the first portion 3, the second lateral part 27 becomes an area of contact and retention in position in the through opening of the first portion 3 itself. Fixing of the first portion 3 in the body 6, in particular in the through hole, is thus optimised; the risk that the first portion 3 of the absorbent matrix moves relative to the body, or is even detached from the latter, is considerably reduced compared to coupling solutions in which the absorbent matrix is interposed between two panels that are premade and/or joined to each other by mechanical interaction, for example by inserting the projecting portions thereof against each other.

Figure 11:
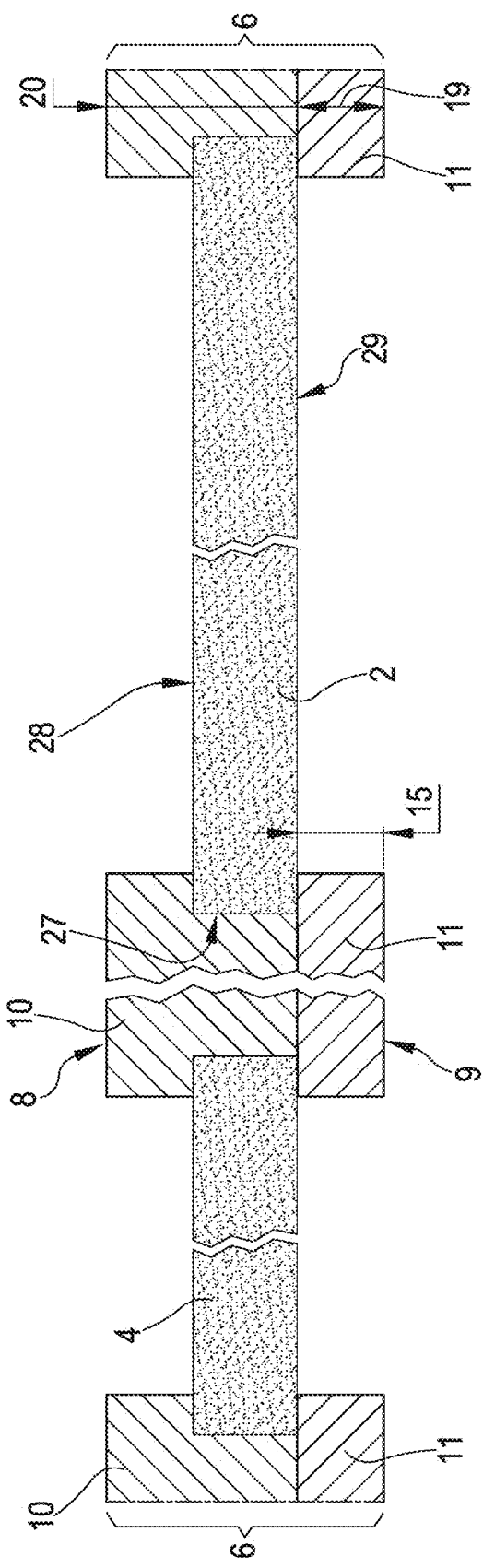
FIG. 11 illustrates a sectional view of a specific intermediate production step for the support 1, alternative to the step schematically illustrated in FIG. 10.

FIG. 11 illustrates a variant of the step of positioning the upper portion 10 of the body 6 by moulding or co-moulding plastic material on the support formed by the lower portion 11 of the body 6. In this variant, the upper portion 10 of the body 6 at least partially overlaps the first portion 3 of the absorbent matrix 2, thus defining an area of contact that comprises both the second lateral part 27 of the first portion 3, and part of the upper face thereof. This configuration advantageously makes it possible to produce a body 6 capable of retaining at least the first portion 3 of the absorbent matrix 2 along the direction identified by the third reference axis Z, both ways. This makes it possible, during use, to reduce the risk of the first portion 3 being detached from the body 6, in particular after punching.

Figure 12:
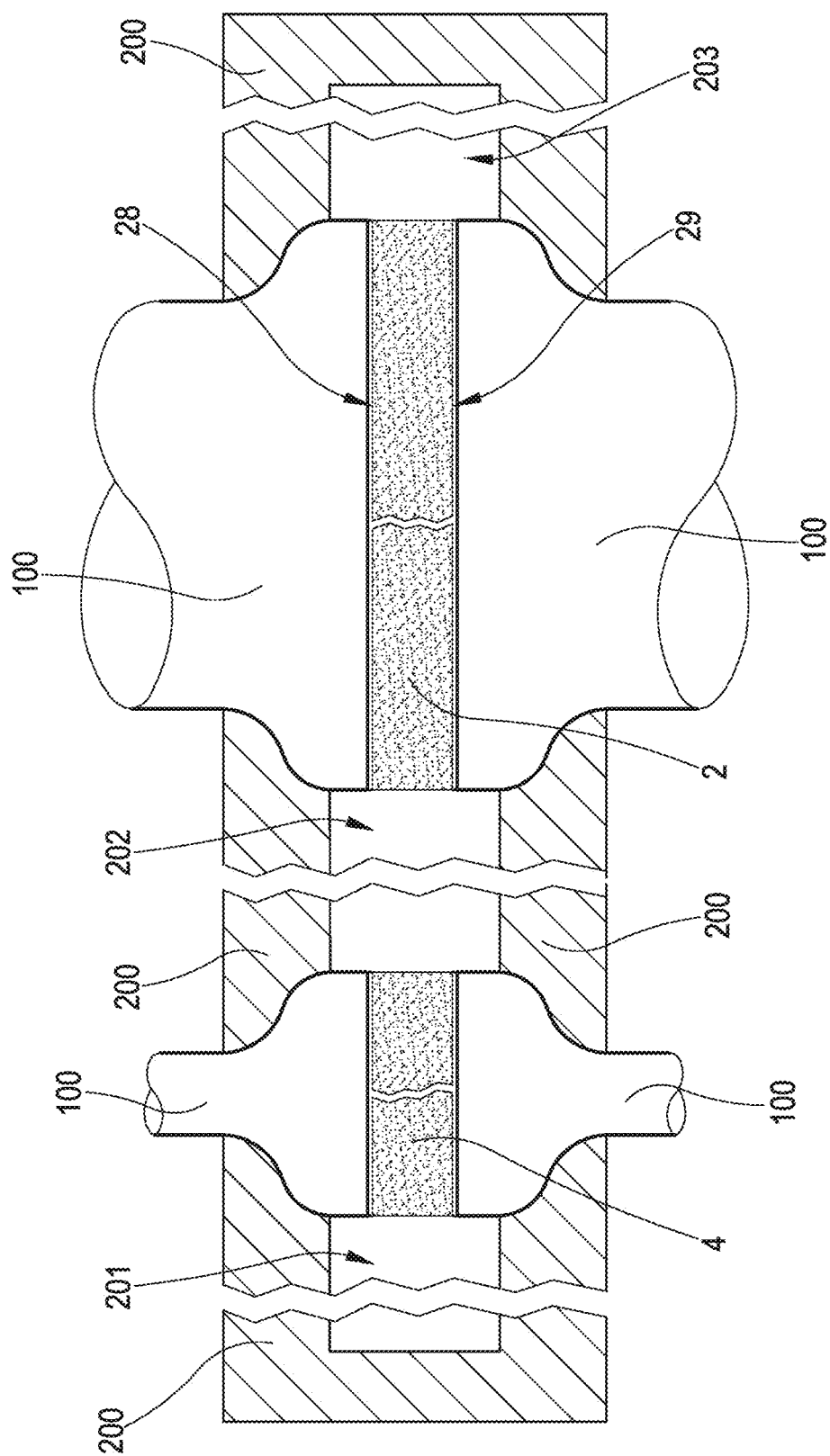
FIG. 12 and FIG. 13 illustrate sectional views of intermediate production steps for the support 1, in accordance with a specific production technique.
Figure 13:
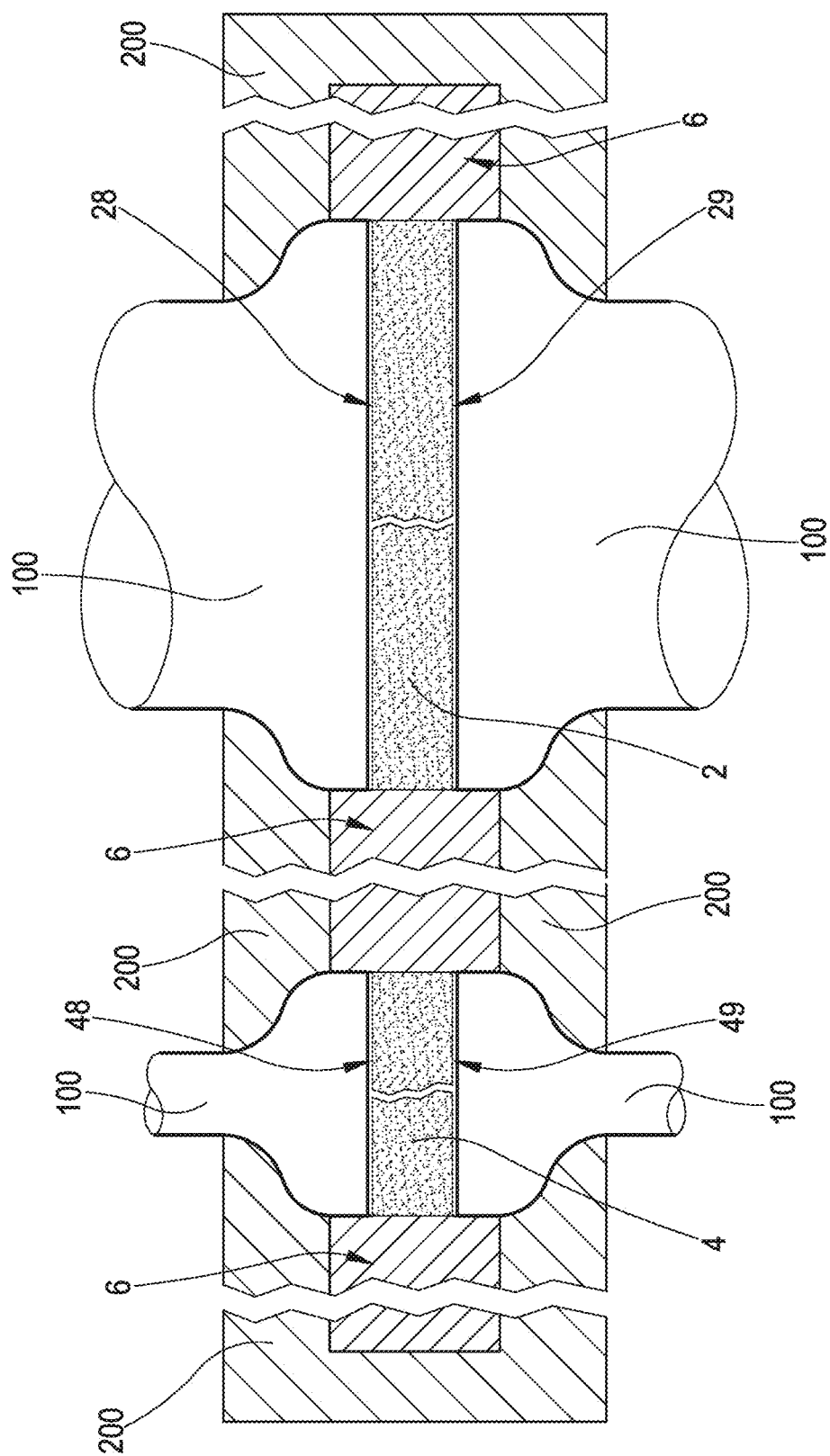

A further alternative of the production process for producing the support 1 is described in FIGS. 12 and 13. In this further alternative, a first step of the process comprises cutting a portion of an absorbent matrix 2 according to a predetermined shape, after which the portion of the absorbent matrix 2 is positioned in a retaining device 100 inside a mould.

Plastic material is subsequently moulded or co-moulded or overmoulded at least around the portion of absorbent material 2 retained by the retaining device 100. In particular, the retaining device 100 can retain the portion of the absorbent matrix 2 in such a way as to leave only the second lateral part exposed. In accordance with this aspect, the plastic material, when moulded or co-moulded or overmoulded, enters into contact at least with the second lateral part 27 of the portion of the absorbent matrix 2. The dimensions of the retaining device 100 along the plane identified by the aforesaid first and second reference axes X, Y are therefore equal to the dimensions assumed, respectively, by the first portion 3 and second portion 4. In this case, illustrated in the variant of FIGS. 12 and 13, the first portion 3 of the absorbent matrix 2 is retained exclusively by the lateral surface thereof, which is substantially oriented along the third reference axis Z.

In particular, FIGS. 12 and 13 illustrate an embodiment in which the support 1 comprises a first portion 3 and a second portion 4. The second portion 4 is retained by a second retaining device 100, conveniently in the same configuration as the retaining device 100 used to retain the portion of the absorbent matrix 2.

The plastic material is subsequently moulded or co-moulded or overmoulded within the mould 200, filling the space previously occupied by the cavities 201, 202, 203 and thus forming the body 6.

A variant of the production process for producing the support 1 described above is represented in FIGS. 14 and 15. In this further alternative, a first step of the process comprises cutting a portion of an absorbent matrix 2 according to a predetermined shape, after which the portion of the absorbent matrix 2 is positioned in a retaining device 100 inside a mould.

Figure 14:
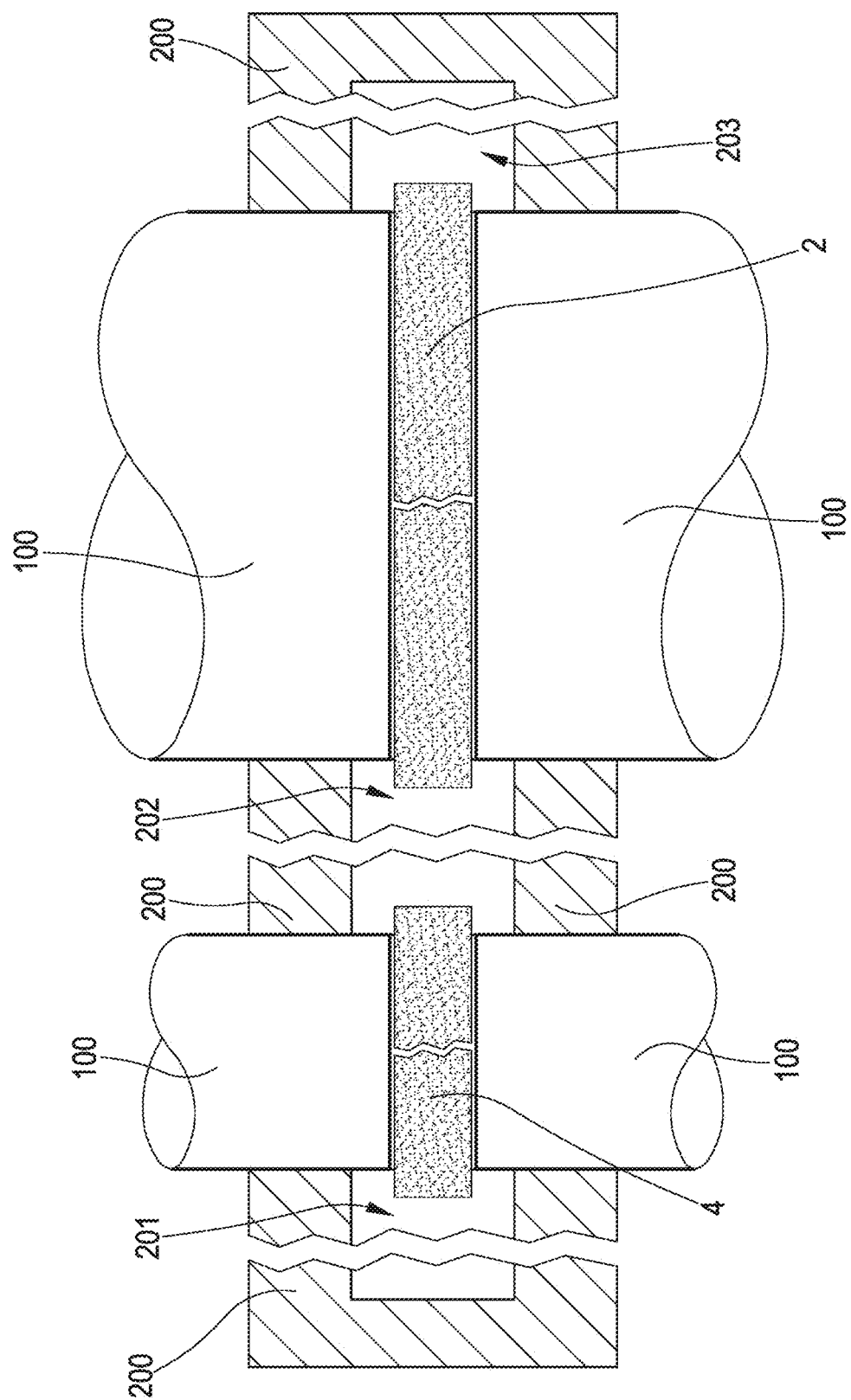
FIG. 14 and FIG. 15 illustrate sectional views of intermediate production steps for the support 1, in accordance with a specific production technique alternative to the one of FIGS. 12 and 13.
Figure 15:
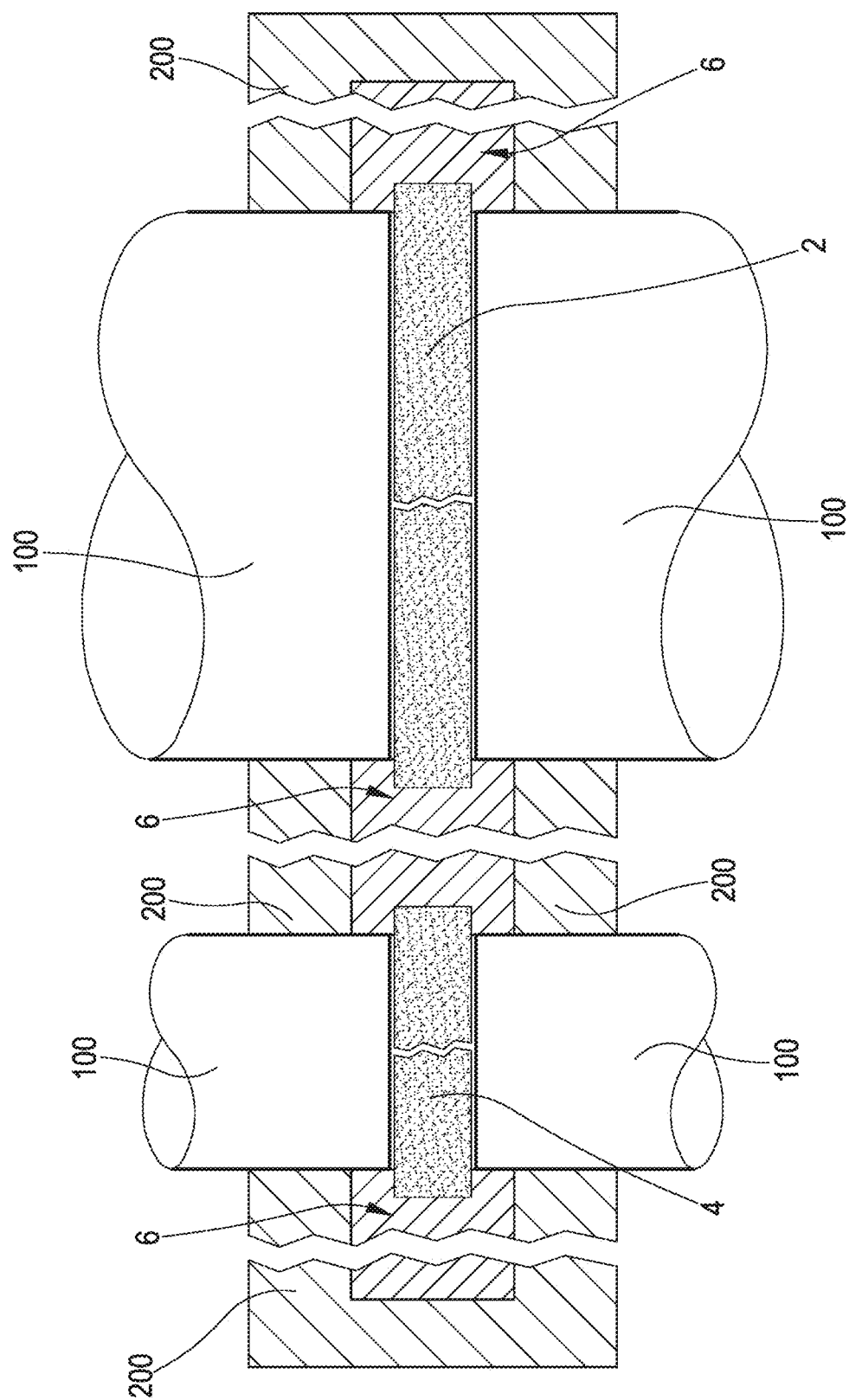

Plastic material is subsequently moulded or co-moulded or overmoulded at least around the first portion 3 of the absorbent matrix 2 retained by the retaining device 100. In particular, the retaining device 100 can retain the portion of the absorbent matrix 2 in such a way as to leave only the second lateral part exposed. In accordance with this aspect, the plastic material, when moulded or co-moulded or overmoulded, enters into contact with the second lateral part 27 of the portion of the absorbent matrix 2 and with part of the lower and upper surfaces thereof. In particular, FIGS. 14 and 15 illustrate an embodiment in which the support 1 comprises a first portion 3 and a second portion 4. The second portion 4 is retained by a second retaining device 100, conveniently in the same configuration as the retaining device 100 used to retain the portion of the absorbent matrix 2. The dimensions of the retaining device 100 along the plane identified by the aforesaid first and second reference axes X, Y are thus smaller than the dimensions assumed, respectively, by the first portion 3 and the second portion 4. This configuration advantageously makes it possible to form the previously mentioned first and second profiles of discontinuity of thickness, thanks to which the first and second portions 4 are retained not only by their lateral surface 7, but also in a direction parallel to the direction identified by the third reference axis Z.

The plastic material is subsequently moulded or co-moulded or overmoulded within the mould 200, filling the space previously occupied by the cavities 201, 202, 203 and thus forming the body 6 in a single piece, thereby obtaining a support 1 for biological materials as per FIG. 16, which has the same features as the support 1 represented in FIG. 5, with the difference that the upper and lower portions of the body 6 are in this case replaced by a single portion of body 6, whose thickness is substantially given by the sum of the thicknesses of the portions mentioned previously.

For all variants of the production process described thus far, when the manufacturer selects the particular plastic material, a step of the production process can comprise identifying the temperature or interval of temperatures at which the plastic material can be correctly moulded, and, within the aforesaid interval, proceeding to select the minimum or substantially the minimum among the temperatures in the aforesaid interval in order then to proceed to heat the plastic material at the aforesaid temperature. Thanks to this aspect, it is possible to minimise the alteration of the cellulose that is part of the absorbent matrix 2.

In the production process for producing the support 1, if it is desired to obtain an embodiment provided with a unique identification code 30, a step—preferably electronic—of assigning a unique identification number to a specific support 1 is performed, followed by a step of transforming the unique identification number into a visual code that is subsequently transferred onto the body 6 of the paper. The Applicant has observed that, in particular when the transfer takes place by laser, it is advisable to maintain a predetermined distance, at least equal to 2-3 mm, between the unique identification code 30 and at least the first portion 3 of the absorbent matrix 2, in order to avoid contaminations or alterations due to use of the aforesaid laser.

The Applicant has further observed that plastic materials, and particularly the ones mentioned above for the production of the body 6, are subject to dimensional change according to temperature. In particular, the Applicant has observed that the coefficient of linear thermal expansion of plastics typically ranges between 0.014 and 0.2 mm/m/° C. The Applicant has conceived a production process that takes into account this coefficient of linear thermal expansion of plastic materials with the aim of mitigating and if possible reducing the adverse effects on the absorbent matrix 2. This aspect has been noted in particular because the step of moulding or co-moulding or overmoulding are steps distinguished by the fact of having a considerable change in temperature between when the plastic is moulded or co-moulded or overmoulded and when the plastic, cooled, renders the support 1 ready for use. The temperature change can substantially be around 80° C. or more. With a temperature change towards cooling, the effect that can be obtained on the body 6 is a reduction in the overall dimensions along the first and/or second and/or third reference axis X, Y, Z, and simultaneously an increase in the size of the through opening 13, for at least the first portion 3 of the absorbent matrix 2 and—if present—for the further portions 4, 5.

In particular the Applicant has observed that, especially where plastics with a high thermal expansion coefficient are used, the contraction of the plastic can provoke breakage of the absorbent matrix 2 or ungluing from the zones of contact thereof with the body 6. The reduced thickness 16 of the absorbent matrix 2 makes breakage thereof by tearing particularly easy, in particular due to traction along the first reference axis X and/or along the second reference axis Y; breakage by tearing is particularly easy in particular since the matrix 2 has a substantially stable size, i.e. it has little elasticity. For this reason, the Applicant has advantageously conceived a compensator for compensating dimensional alterations, in particular extensions or contractions, of the body 6, which is provided in the position of the absorbent matrix 2.

The Applicant has likewise observed that the first portion 3 of the absorbent matrix 2 could be subject to phenomena of alteration due to extension or contraction, particularly along the first reference axis X and/or second reference axis Y, especially when the sample of biological material is deposited.

A first alternative for resolving the above-mentioned problem, before the plastic material is moulded or co-moulded or overmoulded at least around the first portion of the absorbent matrix 2 retained by the retaining device 100, consists in leaving the portion of the absorbent matrix 2 limp, so that after the cooling of the plastic material, the thermal contraction thereof causes a pulling of the absorbent matrix 2 such as to bring it into an almost planar configuration where the first and second faces 28, 29, respectively upper and lower, lie in parallel planes, each of which comprises the first and second directions identified by the first and second reference axes X, Y. The first alternative is applicable both in the event that the body 6 is made by first forming the first lower portion 11 and subsequently the second upper portion 10, the portions overlapping each other in the direction identified by the third reference axis Z, and in the event that the body 6 is made in the form of a unitary element.

A second alternative for resolving the above-described problem consists in defining, before the plastic material is moulded or co-moulded or overmoulded at least around the first portion of absorbent matrix 2 retained by the retaining device 100, a third part 22 for the absorbent matrix 2 suitable for compensating for thermal expansions or contractions of the plastic material of the body 6, both in extension and in contraction, after which the through opening 13 where the first portion 3 of the absorbent matrix 2, changes size. This second alternative is schematically represented in FIGS. 17 and 18. The second alternative is applicable both in the event that the body 6 is made by first forming the first lower portion 11 and subsequently the second upper portion 10, which overlap each other in the direction identified by the third reference axis Z, and in the event that the body 6 is made in the form of a unitary element.

As may be observed in FIG. 17, the third part 22 comprises an undulation, in particular along the plane X, Y of the surface of the absorbent matrix 2. The undulation, in a preferred, but non-limiting embodiment, is formed in proximity to the perimeter of the absorbent matrix 2, and more in particular extends over the whole perimeter of the absorbent matrix 2. The portion of the absorbent matrix 2 not characterised by the presence of the third part 22 is substantially planar, and in particular oriented along a plane parallel to the plane identified by the first reference axis X and the second reference axis Y.

The third part 22, during the phase of contraction in the size of the body 6 caused by cooling of the plastic material after moulding, stretches out; the undulation is progressively reduced in width until the entire free surface of the absorbent matrix 2 is brought into a condition of parallelism or substantial parallelism with the plane X,Y. The third part 22 thus has at least a first configuration of use of greater extension, suitable for compensating for an expansion of the dimensions of the through opening 13 for the first portion 3 of absorbent matrix 2—due to a thermal contraction of the body 6—and at least a second configuration of use of smaller extension or greater bending, suitable for compensating for a contraction of the dimensions of the through opening 13 for the first portion 3 of absorbent matrix 2—due to an expansion or contraction of the body 6, be it thermal or of another nature.

In order to produce the third part 22, as illustrated in FIG. 18, use can be made of a retaining device 100 whose surface in contact with the absorbent matrix 2 has a shaped profile 101, and a retaining device 100, opposing the previous one, whose surface in contact with the absorbent matrix 2 has a recess 102 of a shape matching that of the profile 101. In other words, the step of retaining the absorbent matrix 2 within the mould can comprise a step of positioning the absorbent matrix 2 between two retaining devices 100 whose surface has a matching shape, so as to create the third part 22, for example prior to the step of introducing plastic material into the mould.

The production process for producing the support 1 subsequently comprises a step of introducing the plastic material into the mould so as to create a locking of the at least a first portion 3 of the absorbent matrix 2 onto the body 6; after this step, a step of cooling the plastic material within the mould 200 causes a contraction of the dimensions of the body 6, which comprises a variation in the dimensions of the through opening 13 affecting the at least a first portion 3 of the absorbent matrix 2, with a consequent extension, in particular at least a partial one, of the third part 22 of the absorbent matrix.

The applicant has observed that the presence of a third part 22, whose surface can be extended or contracted, for example due to a variation in the dimensions of the body 6, advantageously avoids curvatures of the absorbent matrix 2 which could exceed the thickness of the first and second profiles of discontinuity of thickness 24, 25, so that the absorbent matrix 2, if the third part 22 were not present, could enter into contact with potentially contaminating materials or bodies. For this reason, the third part 22 represents the optimal solution where it is desired to reduce the risk of accidental contacts of the absorbent matrix 2 with potentially contaminating materials or bodies, especially in the event that the support 1 is subjected, during the step of taking a biological sample or processing the same, to particular cooling or heating operations at temperatures other than typical ambient temperatures.

The present disclosure further relates to a device for taking and/or analysing samples of biological material. The device comprises at least one apparatus configured to firmly grip the support 1, in any of the embodiments described previously, in order to place it in a position for taking the sample of biological material. The device for taking and/or analysing samples of biological material is configured in particular to dispose a punch thereof at least over the first portion 3 of the absorbent matrix 2 where the sample of biological material has been previously deposited. Specifically, in a first operating configuration the punch enters into contact with, and in particular perforates, the absorbent matrix 2 in a direction preferably substantially parallel to the third reference axis Z. Said perforation is followed by a removal of a part of the absorbent matrix 2 of the first portion 3, which is subsequently examined by a technique that is not the subject matter of the present application and is therefore not described.

In a particular embodiment, the device for taking and/or analysing samples of biological material can be further equipped with a processing unit electrically connected with a radio frequency stage provided with an antenna specifically conceived to read the radio-frequency identification chip 31. The data processing unit can be a general purpose processor specifically configured through a software or firmware program to carry out one or more parts of the process described previously, or an ASIC or dedicated processor, specifically programmed to carry out at least part of the operations of the method or process as per the present disclosure.

Prior to the step of taking a sample of biological material, the device for taking and/or analysing samples of biological material is configured, preferably, to set itself in a second operating configuration in which the punch is positioned over the second portion 4, and wherein at least part of the punch is cleaned before the sample of biological material is taken. In particular, the punch is cleaned by perforation of the second portion 4, preferably along a direction substantially parallel to the direction identified by the third reference axis. After being positioned in the second operating configuration, the punch goes into the first operating configuration in order to extract the sample of biological material that will be subjected to analysis from the support 1. The concepts herein make it possible to avoid contamination of the portion of the absorbent matrix suitable for conserving a sample of biological material. The concepts herein enable a simpler and more rapid cleaning of the sample-taking device. The concepts herein further make it possible to provide a support for biological samples having an optimal rigidity so as to avoid undesirable bending of the support and enable an efficient automatic manipulation of the support itself, thus preventing undesirable contaminations of the biological sample. The concepts herein are moreover convenient to use, easily implementable and simple and economical to produce.

It is clear, finally, that the support of the concepts herein can undergo modifications or additions that are obvious to the person skilled in the art without going beyond the scope of protection provided by the appended claims. The subject matter of the present disclosure is not limited to the embodiments illustrated in the drawings. Therefore, it should be understood that where some features mentioned in the claims are followed by reference numbers or symbols, such numbers or symbols are included solely for the purpose of increasing the intelligibility of the claims and do not limit the scope of protection thereof.

What is claimed is:

1. A production process for producing a support for conserving a sample of biological material, the process comprising:
a step of making a first portion of absorbent matrix from a material comprising cellulose suitable and intended for the storage of a sample of biological material;
a step of positioning the first portion of the absorbent matrix in a mould, and of retaining the first portion of the absorbent matrix in a predetermined position in the mould; and
a step of moulding or co-moulding or overmoulding plastic material in empty spaces of the mould to form a body retaining the first portion of the absorbent matrix, wherein the body is provided with at least a first through opening and is fixed to the first portion of the absorbent matrix at least in a second lateral part of the first portion which is constrained to the body, inserted in the body, and surrounded and enclosed by the body, and wherein the first portion has a first part without support from the body and which is suspended inside the first through opening, the first part of the first portion of the absorbent matrix being directly accessible to contact, and the first portion of the absorbent matrix being maintained in a predetermined position within the first through opening at least by a fastening, contact and/or adhesion between the second lateral part of the first portion of the absorbent matrix and the body.

2. The production process according to claim 1, wherein after the moulding, co-moulding, or overmoulding step, the body assumes a substantially planar shape extending along a first and a second direction respectively defined along a first reference axis and a second reference axis orthogonal to the first reference axis.

3. The production process according to claim 2, wherein the body has a thickness, measured at the first through opening and along a third reference axis orthogonal both to the first and the second reference axis, which thickness is greater than the thickness of the first portion of the absorbent matrix.

4. The production process according to claim 3, wherein the body has a thickness equal to at least 1 mm.

5. The production process according to claim 1, wherein the body has at least a first profile of discontinuity of thickness in a zone of proximity to the first portion of the absorbent matrix.

6. The production process according to claim 1, wherein the body has a first profile of discontinuity of thickness at a first face of the first portion of the absorbent matrix, and a second profile of discontinuity of thickness at a second face of the first portion of the absorbent matrix, substantially where the body at least partly overlaps the first face and the second face.

7. The production process according to claim 1, wherein said step of making the first portion of an absorbent matrix comprises a step of selecting the material comprising cellulose, the first portion of an absorbent matrix having a predefined shape and suitable and intended for the conservation of a sample of biological material.

8. The production process according to claim 7, wherein the material comprising cellulose is of a preserving, DNA-compatible, type.

9. The production process according to claim 1, wherein the absorbent matrix has thickness of 0.2 mm to 1 mm.

10. The production process according to claim 1, wherein the absorbent matrix has thickness of 0.4 mm to 0.8 mm.

11. The production process according to claim 10, wherein the absorbent matrix has a thickness substantially equal to 0.6 mm.

12. The production process according to claim 1, further comprising:
a step of defining a predefined shape for a second portion of the absorbent matrix that is separate from the first portion thereof and is suitable for, configured, and intended to constitute a cleaning zone for the head of a punch suitable for taking a sample of biological material from the first portion; and
a step of positioning the at least a second portion in the mould, and retaining the second portion in a predetermined position in the mould; and
wherein in the step of moulding, co-moulding, or overmoulding plastic material in empty spaces of the mould, the body is formed to retain the first portion of an absorbent matrix and the second portion, wherein the body retains the second portion at least in a second lateral part thereof.

13. The production process according to claim 1, further comprising a step of producing a compensator to compensate for at least the thermal expansion or contraction of the body and/or of the first portion of the absorbent matrix, wherein said compensator is produced in the at least a first portion of the absorbent matrix.

14. The production process according to claim 13 wherein the step of producing said compensator comprises a step of producing at least a third curved or bent part on the absorbent matrix by die-cutting.

15. The production process according to claim 14, wherein the third curved or bent part comprises an undulation and/or bending of the absorbent matrix suitable for defining a locally non-planar profile, and configured to stretch out and/or contract or bend when the body changes in its dimensions due at least to thermal expansion or contraction, and/or when the first portion of the absorbent matrix undergoes expansions or contractions following the deposition of the sample of biological material.

16. The production process according to claim 15, further comprising a step of positioning the absorbent matrix between two retaining devices whose surfaces are of a matching shape, so as to create the third curved or bent part, prior to introducing the plastic material into the mould.

* * * * *